(12) United States Patent
Cham et al.

(10) Patent No.: US 6,597,801 B1
(45) Date of Patent: Jul. 22, 2003

(54) METHOD FOR OBJECT REGISTRATION VIA SELECTION OF MODELS WITH DYNAMICALLY ORDERED FEATURES

(75) Inventors: Tat-Jen Cham, Boston, MA (US); James Matthew Rehg, Arlington, MA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 09/466,970

(22) Filed: Dec. 20, 1999

Related U.S. Application Data
(60) Provisional application No. 60/154,385, filed on Sep. 16, 1999.

(51) Int. Cl.[7] .................................................. G06K 9/00
(52) U.S. Cl. ........................ 382/103; 382/294; 345/474
(58) Field of Search ................................ 382/192, 312, 382/100, 118, 103, 228, 294, 285, 190, 219; 369/30.16, 178.01, 43, 126; 712/234, 222, 4, 3, 9; 345/473, 474, 475

(56) References Cited

U.S. PATENT DOCUMENTS

| | | | | |
|---|---|---|---|---|
| 4,513,286 A | * | 4/1985 | Irabu ............................... 343/5 |
| 5,430,445 A | * | 7/1995 | Peregrim et al. .............. 342/25 |
| 5,687,286 A | * | 11/1997 | Bar-Yam .................... 395/2.41 |
| RE36,041 E | * | 1/1999 | Turk et al. ................... 382/118 |
| 6,188,776 B1 | * | 2/2001 | Covell et al. ................ 382/100 |
| 6,269,172 B1 | * | 7/2001 | Rehg et al. ................. 382/103 |
| 6,353,679 B1 | * | 3/2002 | Cham et al. ................ 382/228 |

OTHER PUBLICATIONS

Morris, D.D and Rehg, J.M., "Singularity Analysis for Articulated Object Tracking," In Proc. *IEEE Conf. on Computer Vision and Pattern Recognition*, pp. 289–296, Jun. 1998.

Akra, Mohamed, et al., "Sampling of Images for Efficient Model–Based Vision," *IEEE Transactions on Pattern Analysis and Machine Intelligence*, vol. 21, No. 1, Jan., 1999, pp. 4–11.

(List continued on next page.)

*Primary Examiner*—Bhavesh M. Mehta
*Assistant Examiner*—Seyed Azarian

(57) ABSTRACT

A plurality of object models, where each object model comprises a plurality of features and is described by a model state, are registered in at least one image a subset of the object models is selected. Different object models have different sets of features, which may or may not overlap. A feature of each selected object model is registered in one of the images, and the model state for each selected object model is updated accordingly. The model states of some or all of the object models are then updated according to a set of constraints. These steps are repeated until one or more object models are registered. At the beginning of each registration cycle, a cost function of a subsequent search is determined for each unregistered feature of each object model. An unregistered feature of each object model is then selected such that the cost function is minimized. Object models to which the selected features belong are then selected, and each selected object model's selected feature is registered by matching it to an image. The selected unregistered features are ranked according to some criterion, such as the number of operations needed to search for a feature, i.e., the matching ambiguity. Object models are then selected according to the ranking. Preferably, a predetermined number of object models is selected each cycle.

86 Claims, 20 Drawing Sheets

OTHER PUBLICATIONS

Coutaz, J., et al., "Coordination of Perceptual Processes for Computer Mediated Communication," *Published in the proceedings of the 2nd international conference on Automatic Face and Gesture Recognition, Killington, Vermont, Oct. 1996*, pp. 106–111.

Toyama, K., et al., "Incremental Focus of Attention for Robust Visual Tracking," *CVPR96 1996*, pp. 189–195.

Rowley, H.A., et al., "Neural Network–Based Face Detection," *IEEE Transactions on Pattern Analysis and Machine Intelligence*, vol. 20, No. 1, Jan. 1998, pp. 23–38.

Brown, L.G., "A Survey of Image Registration Techniques," *ACM Computer Surveys*, vol. 24, No. 4, Dec. 1992, pp. 325–376.

Hel–Or, Y., et al., "Constraint Fusion for Recognition and Localization of Articulated Objects," *International Journal of Computer Vision*, 19(1), 5–28 (1996).

Wixon, L.E., et al., "Using Intermediate Objects to Improve the Efficiency of Visual Search," *International Journal of Computer Vision*, 12:2/3, 209–230 (1994).

Cham, T.J., et al., "A Statistical Framework for Long–Range Feature Matching in Uncalibrated Image Mosaicing," *In Proc. Conf. Computer Vision and Pattern Recognition*, pp. 442–447, Santa Barbara, CA, 1998.

Hauck, A., et al., "Hierarchical Recognition of Articulated Objects from Single Perspective Views," *1997 IEEE*, pp. 870–876.

Oliver, N., et al., "LAFTER: Lips and Face Real Time Tracker," *1997 IEEE*, pp. 123–129.

Irani, M., et al., "Mosaic Based Representations of Video Sequences and Their Applications," *Proc. 5th Int. Conf. Computer Vision*, 1995, pp. 605–611.

Cham, T.J., "A Multiple Hypothesis Approach to Figure Tracking," In *Proc. IEEE Conf. on Computer Vision and Pattern Recognition*, pp. 239–245, Fort Collins, CO, Apr. 1999.

* cited by examiner

METHOD FOR OBJECT REGISTRATION VIA SELECTION OF MODELS WITH DYNAMICALLY ORDERED FEATURES

RELATED APPLICATIONS

This Application claims the benefit of U.S. Provisional Application No. 60/154,385, filed Sep. 16, 1999, the entire teachings of which are incorporated herein by reference.

This application is also related to application Ser. No. 60/154,385 entitled "A Method for Efficiently Registering Object Models in Images Via Dynamic Ordering of Features" by Tat-Jen Cham and James M. Rehg, filed on the even day herewith, the entire teachings of which are incorporated herein by reference.

BACKGROUND OF THE INVENTION

There is a large class of applications that depend upon the ability to localize a model of an object in an image, a task known as "registration." These applications can be roughly categorized into detection, alignment, and tracking problems.

Detection problems involve, for example, finding objects in image databases or finding faces in surveillance video. The model in a detection problem is usually generic, describing a class of objects. For example, in a prior art face detection system, the object model is a neural network template that describes all frontal, upright faces. See Rowley et al., "Neural network-based face detection", IEEE Transactions on Pattern Analysis and Machine Intelligence, 20(1), pages 23–38, January 1998. Another example is locating armored vehicles in images for a military targeting system.

An example of an alignment application is mosaicing, in which a single large image is constructed from a series of smaller overlapping images. In this application, each model is simply an image to be added incrementally to the mosaic. The alignment goal is to position each new image so that it is consistent with the current mosaic wherever the two overlap. A description is given in Irani et al., "Mosaic based representations of video sequences and their applications," Proceedings of Int. Conference on Computer Vision, pages 605–611, Cambridge, Mass., 1995.

Another example is the alignment of plural images obtained from different sensors, e.g. aligning remote-sensed images obtained via normal and infra-red photography, or aligning MRI and SPECT medical images. This allows different regions of an image to be analyzed via multimodal (i.e., vector) measurements instead of scalar pixel intensities. These and other applications are further discussed in the survey on image registration, Brown, "A survey of image registration techniques," ACM Computing Surveys, 24(4), pages 325–376, 1992.

In tracking applications, the models are typically specific descriptions of an image object that is moving through a video sequence. Examples include tracking people for surveillance or user-interface purposes. In figure tracking for surveillance, a stick-figure model of a person evolves over time, matched to the location of a person in a video sequence. A representative prior method is Cham et al., "A multiple hypothesis approach to figure tracking," Proceedings Computer Vision and Pattern Recognition, pages 239–245, Fort Collins, Colo., 1999. In user-interface applications, the user's gaze direction or head pose may be tracked to determine their focus-of-attention. A prior method is described in Oliver et al., "LAFTER: Lips and face real time tracker," Proceedings Computer Vision and Pattern Recognition, pages 123–129, San Juan, PR, Jun. 17–19, 1997.

In each of these application areas, there is a desire to handle increasingly sophisticated object models, which is fueled by the increasing demand for sensing technologies. For example, modern user interfaces may be based on tracking the full-body pose of a user to facilitate gesture recognition. As the complexity of the model increases, the computational cost of registration rises dramatically. A naive registration method such as exhaustive search would result in a slow, inefficient system for a complex object like the human figure. However a fast and reliable solution would support advanced applications in content-based image and video editing and retrieval, surveillance, advanced user-interfaces, and military targeting systems.

Therefore, there is a need for a registration method which is computationally efficient in the presence of complex object models.

There are many situations when different models are used for registering the same object. For example, an image indexing engine may register objects in images with different models using different feature sets such as color or outline shape depending on the query. Another example would be a visual surveillance network which tracks a person in multiple cameras, using separate full-body kinematic models in each camera view.

A simple approach is to register each of the models independently. However, this does not take advantage of the redundancy between the models and additionally suffers from:

1. Reduced Accuracy

By failing to exchange information between the processes, registration errors can accumulate independently on the different processes, leading to reduced accuracies for all model states;

2. Discrepancies Between Model States

Independent registration also results in the violation of inherent constraints between model states. For example, tracking a single object using independent sensors may result in the sensors reporting very different positions for the object after some elapsed time. This may result from one of the sensors being distracted at an earlier instant by outlier noise such as background clutter. If the constraint of common position were enforced, tracking would be more robust as errors are resolved earlier; and 3. Poor Efficiency The overall registration is only as fast as the slowest process. Hence if one of the processes is inefficient due to its features having high matching ambiguities, the overall registration speed is reduced. As an example, consider tracking a human using separate processes in separate cameras in a stereo setup. If the person moves partially out of the field-of-view of one of the cameras, the associated tracking process may be significantly slower if for example only the smaller features such as the arms or legs are visible. The overall tracking speed is reduced even though the second tracking process which has the full view of the person may be running at full speed.

Some methods take advantage of the redundancy by enforcing constraints between the states of the different models. This step typically involves correcting the model states after initial estimates have been made by registering all the features. For example, in the case of tracking, this corrective step is taken each time frame after the registration processes have been completed. While this may resolve problems with reduced accuracies and state discrepancies (i.e. items 1 and 2), it does not improve the poor efficiency as the rate limiting step is still dependent on the slowest registration process.

SUMMARY OF THE INVENTION

The present invention registers a plurality of object models in at least one image, one feature per model at a time. Until now, sequential feature registration has been done in an order predetermined before any registration begins. The Applicants have found that the process of registration can be optimized by determining a feature registration order dynamically, that is, at the beginning of each registration step, selecting the feature whose registration will be most cost effective and searching for that feature. In addition, only a subset of the models are selected for registration during at each cycle in the registration process. After registering features of the selected object models, the other object models' states are updated according to inter- and intra-constraints.

Accordingly, in a preferred method of registering a plurality of object models in at least one image, where each object model has a plurality of features and is described by a model state, an unregistered feature of each object model is selected such that an associated cost function of a subsequent search is minimized. A subset of the object models is selected responsive to the selected features. For each selected object model, a search is performed for a match of the associated selected model feature to the image or images to register the feature, and the model state is updated accordingly. The model states of some or all of the object models are then updated according to a set of constraints. These steps are repeated until all features have been registered.

In one embodiment, the selected unregistered features are ranked according to some criterion, such as the number of operations needed to search for a feature, i.e., the matching ambiguity. Object models are then selected according to the ranking. Preferably, a predetermined number of object models is selected each cycle.

In a preferred embodiment, just one object model, the object model having the smallest matching ambiguity among all object models, is selected.

Constraints can be intra-model constraints and/or inter-model constraints, and restrict the model states to a shared relationship.

Preferably, each search is performed in a region of high probability of a match. The cost function for a feature is based on the feature's basin of attraction, and in particular can be based on the complexity of the search process at each basin of attraction.

A search region can be based on a projected state probability distribution. A search is preferably based on maximizing a comparison function.

Selecting and searching are preferably responsive to a propagated state probability distribution. The state probability distribution is projected into feature space.

For each unregistered feature, the number of search operations required to find a match with at least a predetermined probability is determined, and the feature requiring a least number of search operations is selected.

The number of required search operations is determined by first finding search regions within a feature space, where each region has an associated probability density which exceeds some predetermined threshold. A total probability is then formed by summing the probabilities associated with each of the found search regions. If the total probability is less than the predetermined probability, the threshold is lowered and new regions are found and the probabilities summed. This process repeats until the total probability is greater or equal to the predetermined probability. Finally, the number of required search operations is computed, based on the found search regions.

Searching can comprise feature-to-feature matching. In this case, the number of search operations is preferably the number of target features located within each search region. The number of target features located within the search region can be based on Mahalanobis distances to potential target features.

In a preferred embodiment, target features are approximately uniformly distributed, and the number of features is proportional to the search region's size. Thus, the features can be ranked according to the sizes of the associated search regions.

Alternatively, searching can comprise feature-to-image matching. Here, the number of required search operations is computed, for each search region, by first dividing the region into minimally-overlapping volumes which have the same size and shape as a basin of attraction associated with the feature, and then by counting the number of volumes required to cover the regions.

In some embodiments, feature-to-feature matching can be employed for some object models while feature-to-image matching is employed for other object models.

In a preferred embodiment, counting the volumes is approximated by obtaining eigenvalues and eigenvectors to a covariance matrix associated with the feature search region. A basin of attraction span is calculated for each eigenvector direction, and a count is approximated from the eigenvalues and the spans.

Model states of the selected object models are updated according to a propagated state probability distribution. Preferably, the propagation of the probability distribution for an object model is based on successive registered features.

The proposed invention is thus a framework for integrating a plurality of sequential feature registration processes. The processes have separate model states and sets of features. The framework allows only a subset of the processes to carry out feature search during each feature matching cycle. The processes in this subset are referred to as "operative processes." In a preferred embodiment, there is only one operative process during each cycle.

The framework chooses the operative processes by ranking the currently selected features in all processes. The operative processes are associated with the smallest matching ambiguities in the selected features.

The framework also enforces any given set of constraints which apply to any model state. This may include constraints which restrict a plurality of model states to some shared relationship. Constraint satisfaction is carried out after the operative processes have completed feature search and state update. All model states are then minimally modified such that the given set of constraints is satisfied.

In a preferred embodiment, linear constraints are satisfied via the method of Lagrange multipliers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention comprises a new class of sequential feature registration methods for efficient model-to-image matching. This new class has four advantages over sequential registration methods known in the prior art.

First, features are selected dynamically at each stage of a multi-stage registration process so as to minimize the required number of search operations.

Second, feature selection is based on both propagated prior state probabilities and image or feature data. Thus all available information is taken into account when ordering features.

Third, the present invention applies to both feature-to-feature and feature-to-image matching problems.

Finally, the method is automatic and can produce different feature orders for different registration problems without the intervention of the user.

The problem of object registration has three main components: 1) an "object model" which describes a target to be located in an input image; 2) a "comparison function" that determines how well a specific instantiation of the object model matches the image data; and 3) a "search strategy" that specifies how to systematically identify occurrences of the object model in the image.

The object model can be further decomposed into two main components: 1) a set of "features," such as templates, edge features, corner features, etc., that describe the visual signature of the object; and 2) a vector of parameters, called the "model state," that encodes the configuration of the features in the image.

Registration can be defined as the search for the model state that minimizes the cost function between the projection of the model features onto image or feature space, and the image itself.

Figure 1:
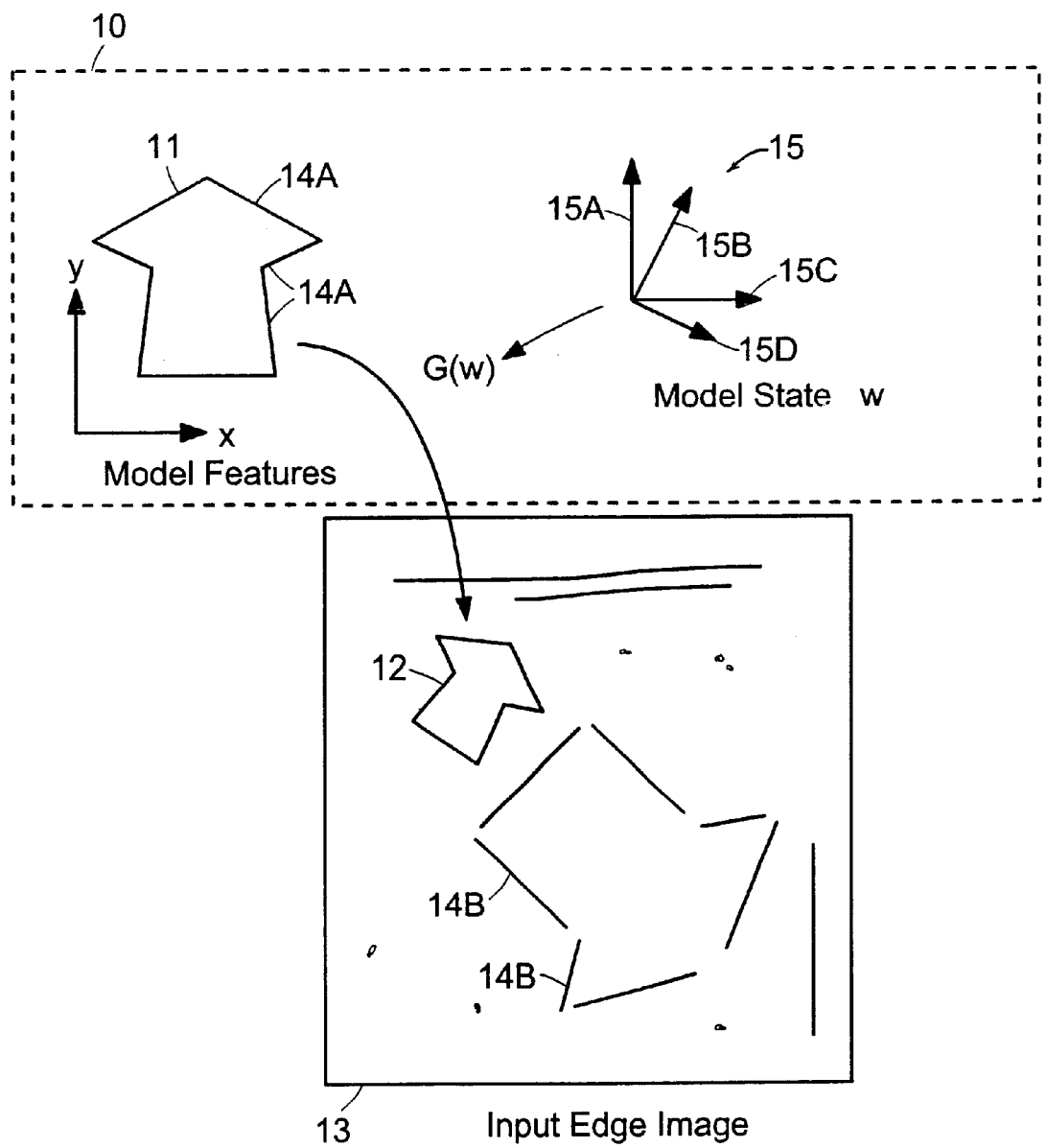
FIG. 1 is a schematic diagram illustrating the projection of a polygonal object model into an image by a transform.

FIG. 1 illustrates an exemplary object model 10 for the task of registering a known 2D polygonal shape in an image 13. The model parameters comprising the model state w 15 in this example encode four degrees of freedom: translation in x 15A and y 15B, rotation 15C, and scaling 15D. FIG. 1 illustrates the projection 12 of the object model features 11 into the image 13 by transform G(w) according to model state w 15. Model features define, for example, edges and corners in the input edge image.

In this example, edges are used as the registration features and the cost function measures the distance between projected model edges 14A and the extracted image edges 14B.

Figure 1A:
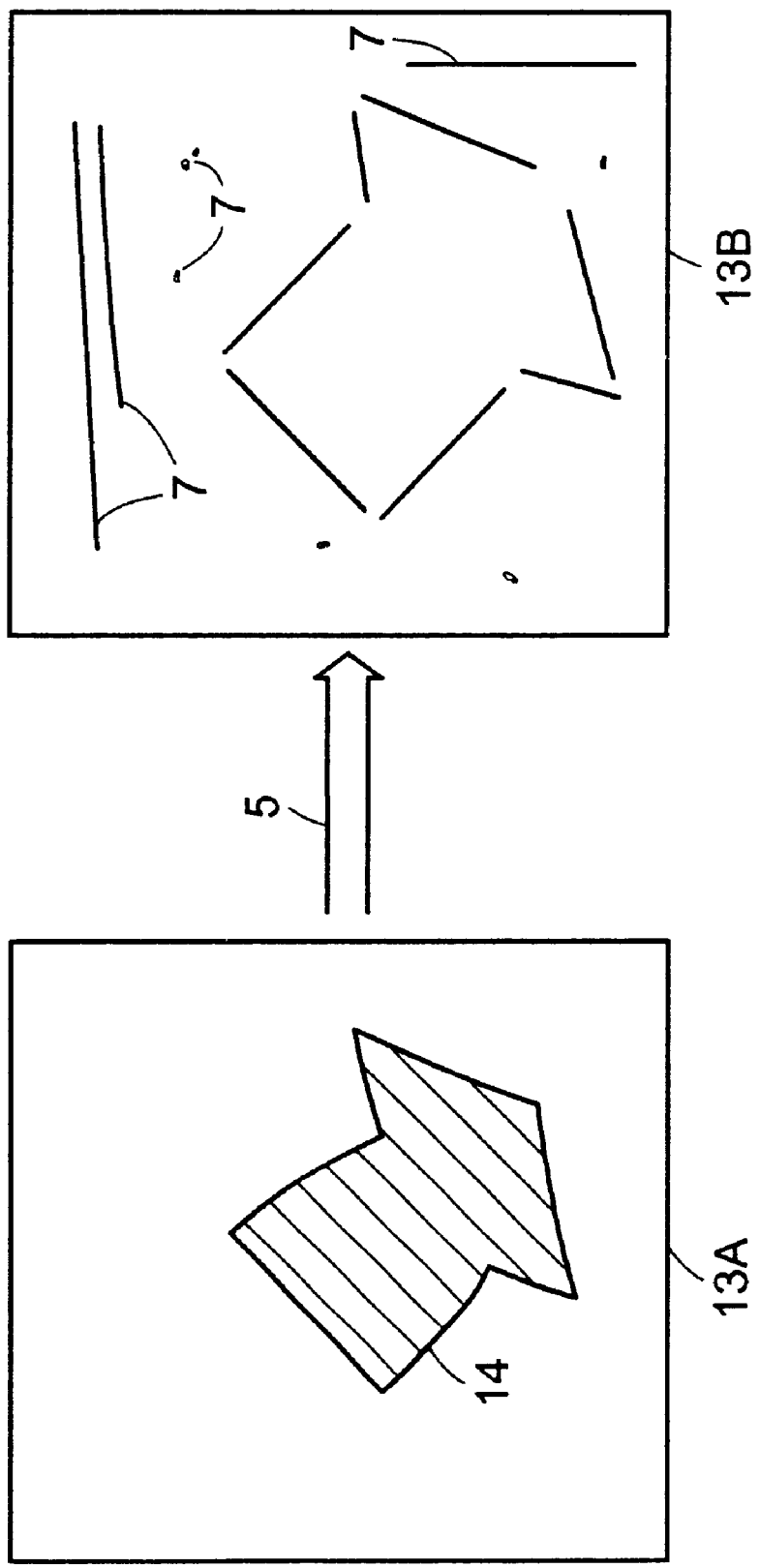
FIG. 1A is a schematic diagram illustrating edge extraction.

FIG. 1A illustrates an extracted edge image 13B resulting from the application of a standard edge detection algorithm 5 to an intensity image 13A containing the target object 14. The presence of spurious lines 7 and corners in the extracted edge image 13B or the input image 13A itself is a major source of difficulty in registration.

Figure 2A:
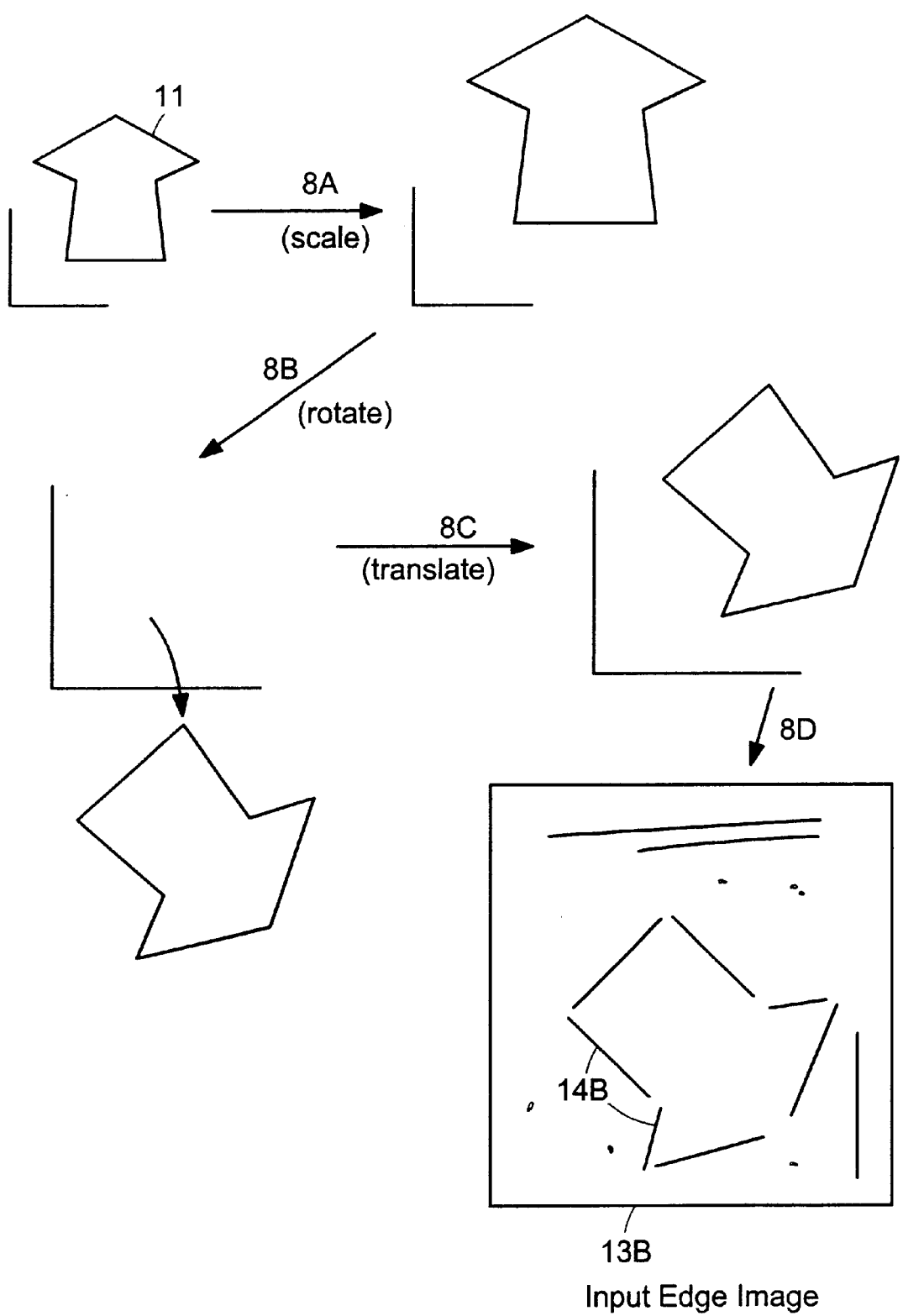
FIG. 2A is a schematic diagram illustrating the transform of an object model into the image.
Figure 2B:
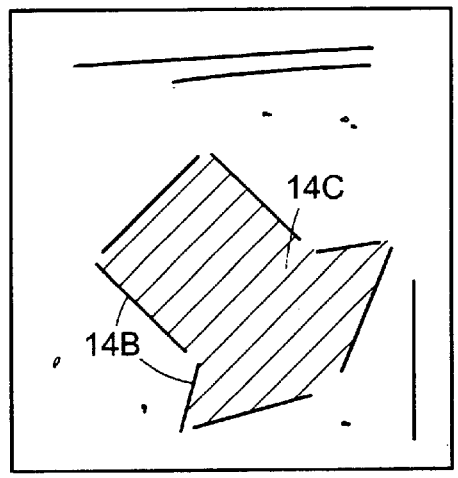
FIG. 2B is an illustration showing the result of successful registration.

FIGS. 2A and 2B show the desired result. FIG. 2A shows how, under the action of some optimal state w*, the polygonal model 11 is scaled 8A, rotated 8B and translated 8C such that it is aligned 8D with its corresponding image edges 14B.

FIG. 2B shows the result of successful registration. Optimal state w* has aligned the polygon model 14C (shaded) with its corresponding image edges 14B.

While the choice of object model and cost function depends greatly on the intended application, the search strategies used in a registration method are often quite general. Thus an improved search algorithm could have a significant impact on a broad range of applications.

The search can be performed either in state space or in feature space. The difficulty of the search problem depends to a large extent on the amount of prior information available about the state. Prior information in state space can be conveniently expressed as a probability distribution, which describes probabilities for the range of possible states.

For example, in a tracking application, the posterior state estimate from the previous frame can provide a strong constraint on the current state, i.e., a state prediction with a small variance. In this case, the state space volume that must be searched will be small, and the possible configurations of the object in the image will be tightly constrained.

Search strategies can update the state vector either sequentially or in parallel. Parallel updates modify all of the state parameters simultaneously to improve the quality of the match. The classical gradient descent algorithm is an example of parallel search. For registration problems with strong prior constraints, gradient-based optimization methods perform well, achieving quadratic convergence rates in many cases.

However, when prior information is weak or nonexistent, as in an object detection problem, sequential search strategies are often more efficient. Sequential search can take place in either state space or feature space. In this approach, subsets of state variables or features are processed in sequence, resulting in incremental updates of the state estimate. A chief advantage is that the search space becomes successively smaller, and the search problem easier, as more features or states are processed.

A classical example of sequential feature search is coarse-to-fine processing using an image pyramid. Starting at the coarsest level, the pyramid is processed sequentially, resulting in a series of state estimates of increasing accuracy.

In contrast to sequential feature search, sequential state space search has been employed in domains such as image mosaicing. For example, it is common in mosaicing to estimate the translation parameters before computing rotation and scale.

In most vision applications the model parameters interact strongly through the image features and it is not possible to optimize them independently when the prior information is weak. Thus the sequential state space method is primarily useful in domains such as mosaicing or visual tracking where there is a strong prior constraint. In contrast, sequential feature methods have much broader applicability. This suggests that an improved algorithm for sequential feature registration could impact many application domains.

1. Static Sequential Feature Registration

Figure 3:
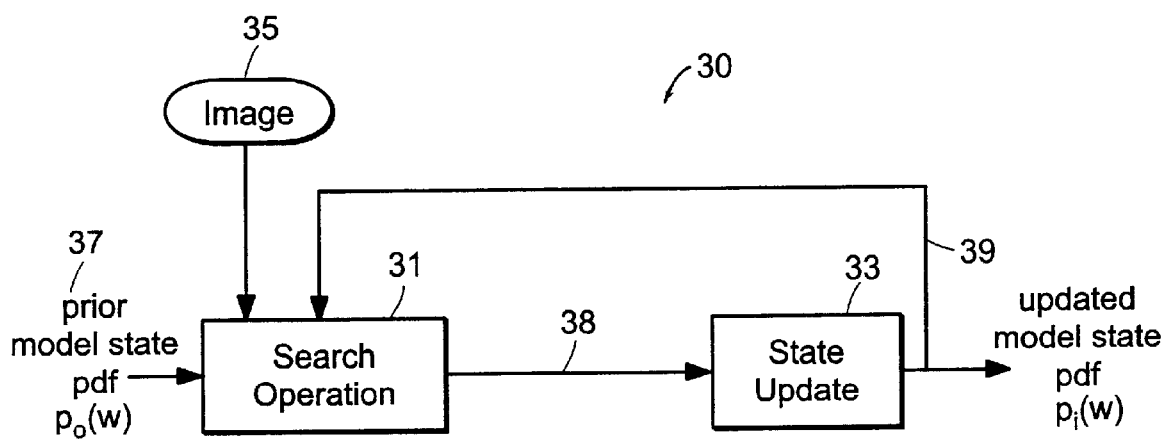
FIG. 3 is a block diagram illustrating static sequential feature registration as is well-known in the art.

The methods of sequential feature registration that are known in the prior art are based on a predetermined, fixed ordering of features. FIG. 3 is a block diagram illustrating the general process 30 for this registration method. In particular, FIG. 3 depicts the case where features are matched directly with the image, known as feature-to-image matching.

The process is iterative. It starts with an input image 35, an initial state distribution typically gleaned from prior knowledge, more commonly known in the art as a prior state distribution $p_0(x)$ 37, and a predefined sequence of features $\{F_i\}_{i=1}^n$. It ends when an acceptable state estimate 39 has been obtained. Processing steps for the ith iteration are as follows:

1. The search operation module 31 identifies the optimal position or configuration 38 for feature $F_i$. For example, in template registration using an image pyramid, $F_i$ would be the template model for the ith level of the pyramid. Under a translational state model, the search would begin at $x_i = n \, x_{i-1}$ and $y_i = n \, y_{i-1}$, where n is the sampling rate for the pyramid and $(x_{i-1}, y_{i-1})$ is the final state estimate from the previous level. Local exhaustive search could be used for a translational model, or gradient-based optimization if the model were more complex. The final state estimate for iteration i would be chosen to minimize the cost function.

2. The state update module 33 uses the result 38 from the search operation module 31 to compute a new probability distribution 39 for the model state. Because an additional feature whose position or configuration has now been determined is now registered, the state probability distribution will be more sharply peaked, representing increased accuracy of the model parameters. In an exemplary implementation, a Gaussian model may be used for the probability distribution. The state update module 33 would then involve a Kalman update step as described in Anderson et al., "Optimal Filtering," Prentice-Hall, 1979, incorporated by reference herein, in which the mean and covariance of the state are computed.

3. Steps 1 and 2 are repeated. The search operation module 31 uses the updated probability distribution 39 from the state update module 33, until the process converges or achieves the desired accuracy.

In some cases, searching is more efficiently carried out by matching the model features directly to features extracted from the image (image features). The features applicable for this form of matching are typically discrete features such as corners, edges and contours. In these instances, the feature extraction is done as an independent process whereby the relevant feature-detector is applied on the image. For example if edge, corner or contour features are to be matched, corresponding edge detectors, corner detectors or B-spline fitting algorithms are used for feature extraction.

Edge detectors are described in Canny, "A computational approach to edge detection," IEEE Trans. Pattern Analysis and Machine Intelligence, vol 8, pages 679–698, 1986. Corner detectors are described in Noble, "Finding corners," Image and Vision Computing, 6(2), pages 121–128, 1988. B-spline feature extraction is described in Cham et al., "Automated B-spline curve representation incorporating MDL and error-minimizing control point insertion strategies," IEEE Trans. Pattern Analysis and Machine Intelligence, 21(1), 1999.

Prior methods for static sequential feature registration have employed a variety of fixed, heuristic feature-ordering schemes. One of the most popular schemes is simply to order the features a priori based on feature size. For example, in one prior method the components of an object (e.g. a cabinet) are sequentially registered based on a pre-determined hierarchical decomposition (e.g. progressing from the overall cabinet frame to the cabinet drawers). See Hauck et al., "Hierarchical recognition of articulated objects from single perspective views," Proceedings Computer Vision and Pattern Recognition, pages 870–876, San Juan, PR, 1997.

Another class of prior methods for size-based feature-ordering is multi-resolution search. The search begins at the lowest image resolution level and hence the coarsest features which survive at this resolution are used first. While the low resolution reduces the amount of search required to find the correspondences, the accuracy of estimation is poor. However once an approximate model state is computed, the search progresses to the next resolution level. At this level smaller features are used. Because an estimate of the model state is known, the search can be confined to smaller regions of the image where these features are expected to be found. The state estimate after incorporating the smaller features becomes more accurate, and thus this routine progresses through the other levels with heuristically minimal search. A method which uses a multi-resolution approach for registration is described in Cham et al., "A statistical framework for long-range feature matching in uncalibrated image mosaicing," Proc. IEEE Conference on Computer Vision and Pattern Recognition, pages 442–447, Santa Barbara, Calif., 1998.

In another prior method, the search for a small object is directed by its known probability of being located in a vicinity of larger objects (e.g., a spoon on table). Hence search is done indirectly by first looking for the large object followed by the desired smaller object. See Wixson et al., "Using intermediate objects to improve the efficiency of visual search," Int. Journal of Computer Vision, 12(2/3), pages 209–230, 1994.

As an alternative to feature size, other prior methods use the a priori robustness of features to order their selection during tracking. See Toyama et al. in "Incremental focus of attention for robust visual tracking," Proceedings Computer Vision and Pattern Recognition, pages 189–195, San Francisco, Calif., 1996. A face-tracking system based on this method uses a fixed hierarchy of tracking methods. At the start, tracking is carried out using the coarsest but most robust method, e.g., skin-color sensor. If the sensor output is deemed to be stable, higher-level methods are used which increase both estimation accuracy and computational cost, e.g. template feature matching. Failure of higher-level methods return the tracker to lower-level methods.

In related prior art by Coutaz et al. a finite state machine is used to determine which feature detectors to apply during visual tracking. See Coutaz et al., "Coordination of perceptual processes for computer mediated communication," Proceedings of 2nd Int. Conference Automatic Face and Gesture Recognition, pages 106–111, 1996. The processes are selected according to an overall confidence measure in tracking obtained from the previous image frame. As in the prior method of Toyama et al. the hierarchy of processes is fixed and manually specified. The difference in these two prior methods is that the finite state machine allows some levels to be bypassed based on a confidence measure.

Another prior art proposes a fixed feature ordering strategy for registering articulated objects which can be described by kinematic chains. See Hel-Or et al., "Constraint fusion for recognition and localization of articulated objects," Int. Journal of Computer Vision, 19(1), pages 5–28, 1996. In this method, features along a kinematic chain are successively matched in linear order from end to end. A linear Gaussian estimation method is used to incrementally improving the model state and covariance estimates.

Another prior method addresses the question of using a predefined subset of the total features in order to achieve a prespecified accuracy. See Akra et al., "Sampling of images for efficient model-based vision," IEEE Trans. Pattern Analysis and Machine Intelligence, 21(1), pages 4–11, 1999. This method addresses image sub-sampling for efficient registration. This is an example of the statistical problem of optimal stopping.

In all the above cases, the ordering of the features are manually fixed prior to the registration process. For example in registering a human kinematic model using template features, the ordering of features may be pre-specified as {torso→face→hair→upper-arm→lower-arm→ . . . }. However, having a fixed feature ordering is sub-optimal for two reasons.

First, prior knowledge of the model state is ignored. For example, in tracking problems, a common occurrence is partial tracking failure. A person tracker may mistrack various limbs due to distractors such as shadows, background clutter and occlusion, yet accurately track other parts of the body. Consider the situation in which a person's lower leg is accurately tracked, but tracking has failed on the rest of the body. The reinitialization process should be able to exploit the accurate localization of the lower leg in registering the rest of the body. This is achieved by a feature order which starts at the lower leg, as described below in Section 3. This clearly demonstrates the need for dynamic feature ordering, since failure modes cannot be predicted in advance.

Second, image data is ignored. Consider a different example in which a computer has an attached camera and is running a vision-based head-detection system as part of an advanced user interface. The system has two low-level sensors for independently detecting skin-color and motion. A person's head can be further localized by using two high-level features: (i) a face feature or (ii) a head-silhouette feature. These features can be detected with significant computational cost, using either a face-detection algorithm which analyzes image regions containing skin-color pixels, or a head-silhouette analysis algorithm which operates on image regions containing motion.

If the computer were used in a room with skin-colored walls, the skin-color sensor would output large candidate image regions, while the motion sensor would produce only a small candidate region. In this case, the person's head would be more efficiently localized using the head-silhouette analysis algorithm first before the face-detector.

Conversely, if the location was a factory floor with moving machinery, there would be large candidate regions for the motion-sensor but a small candidate region for the skin-color sensor. Here it would be more efficient to use the face-detector first. As demonstrated in these examples, the most efficient feature ordering is dependent on the image data and cannot be predicted in advance.

Figure 4A:
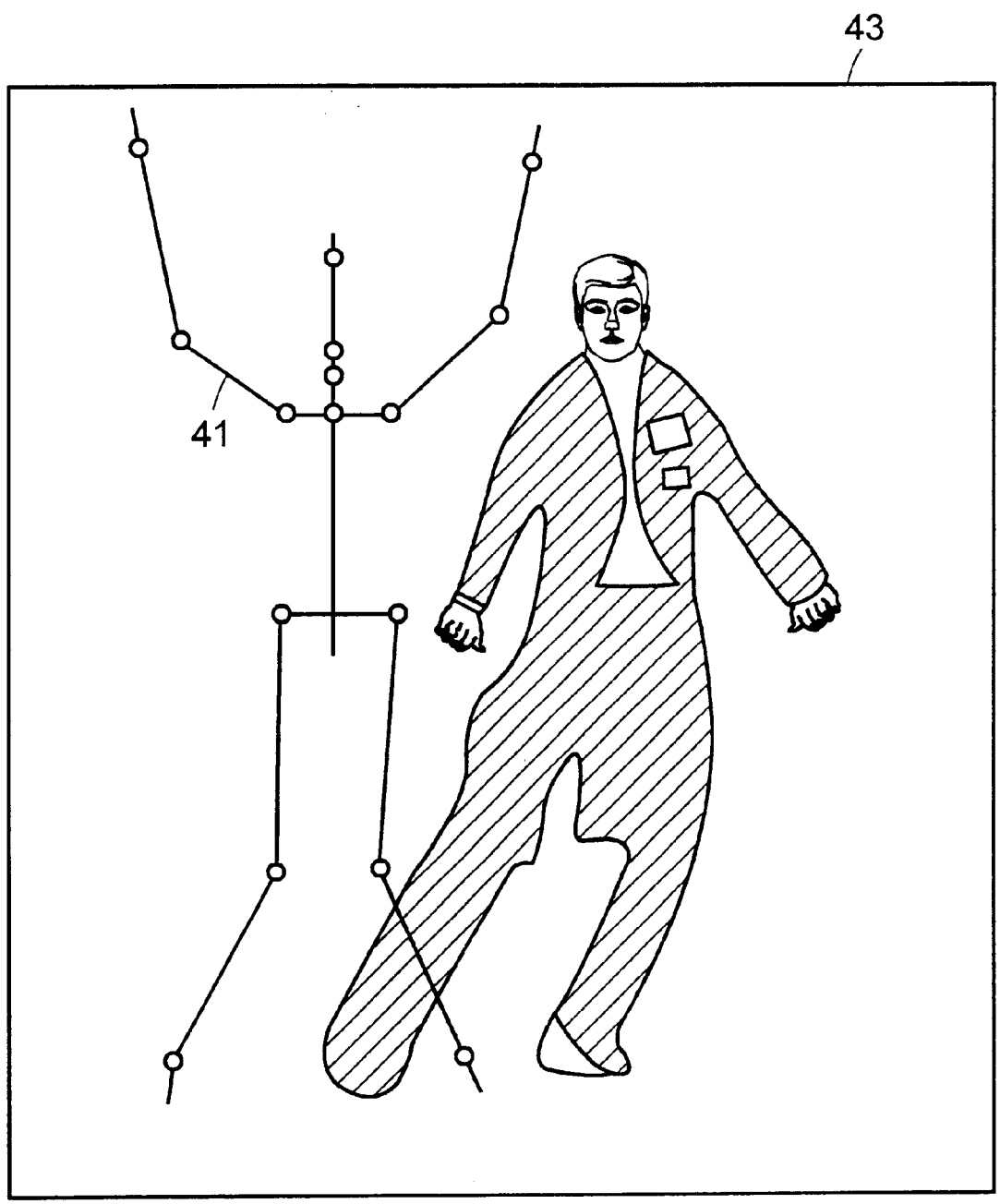
FIGS. 4A and 4B are diagrams illustrating the registering of a kinematic model with known features.
Figure 4B:
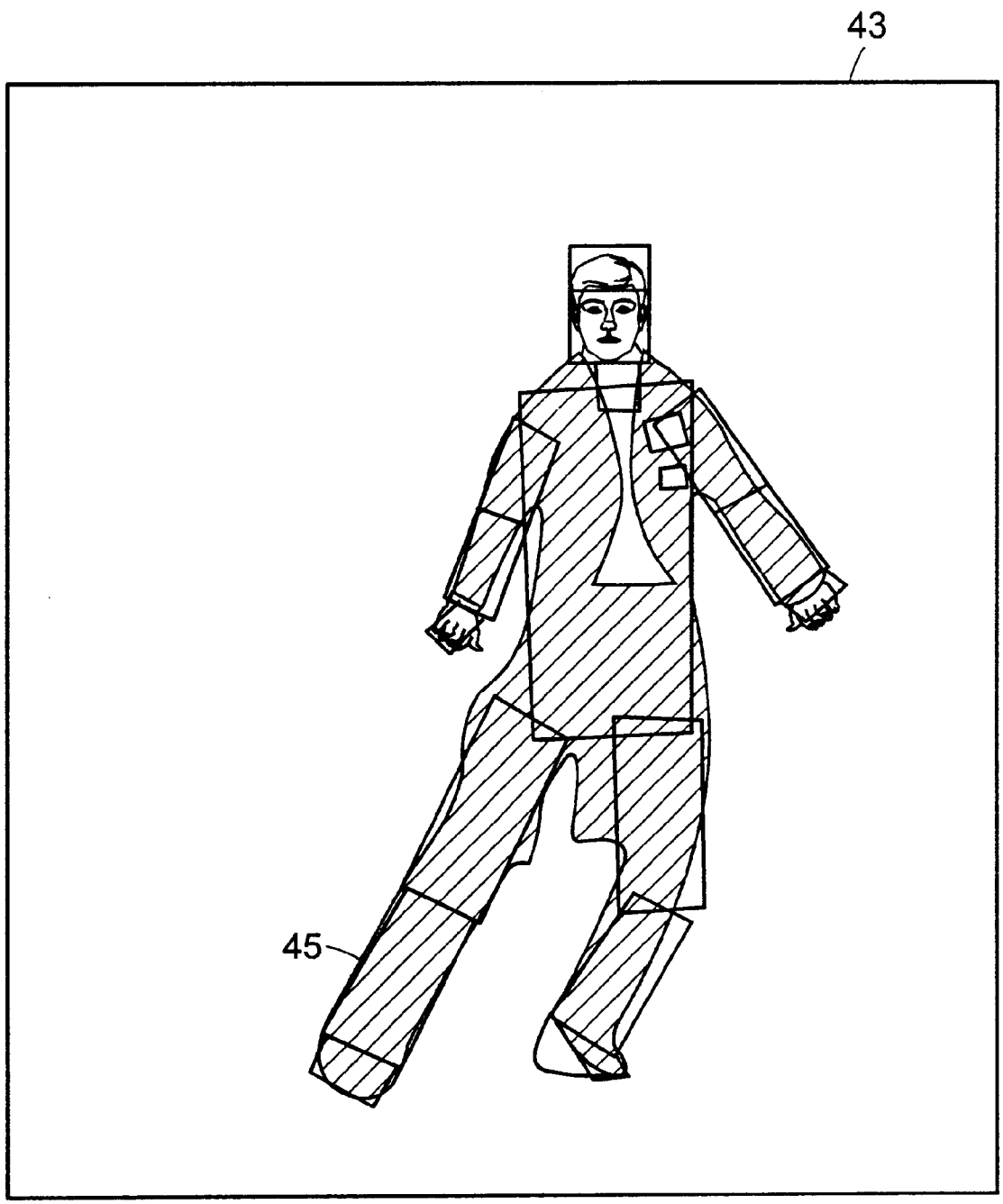

Experimental evidence underscores the importance of selecting the optimal feature ordering for a registration problem. Consider an exemplary task of registering a human kinematic model in an image FIGS. 4A and 4B illustrate the registering of a high-degree of freedom (DOF) kinematic model with known features, but without prior knowledge of the model state, using a template-based feature model known in the art as a scaled prismatic model (SPM). FIG. 4A shows the initial model state of the model 41 compared to the image 43, while FIG. 4B shows the desired feature registration 45. If the model is highly detailed and if the initial feature used was a hand template feature, the search process would take much longer than if the initial feature was the torso template feature.

Figure 5:
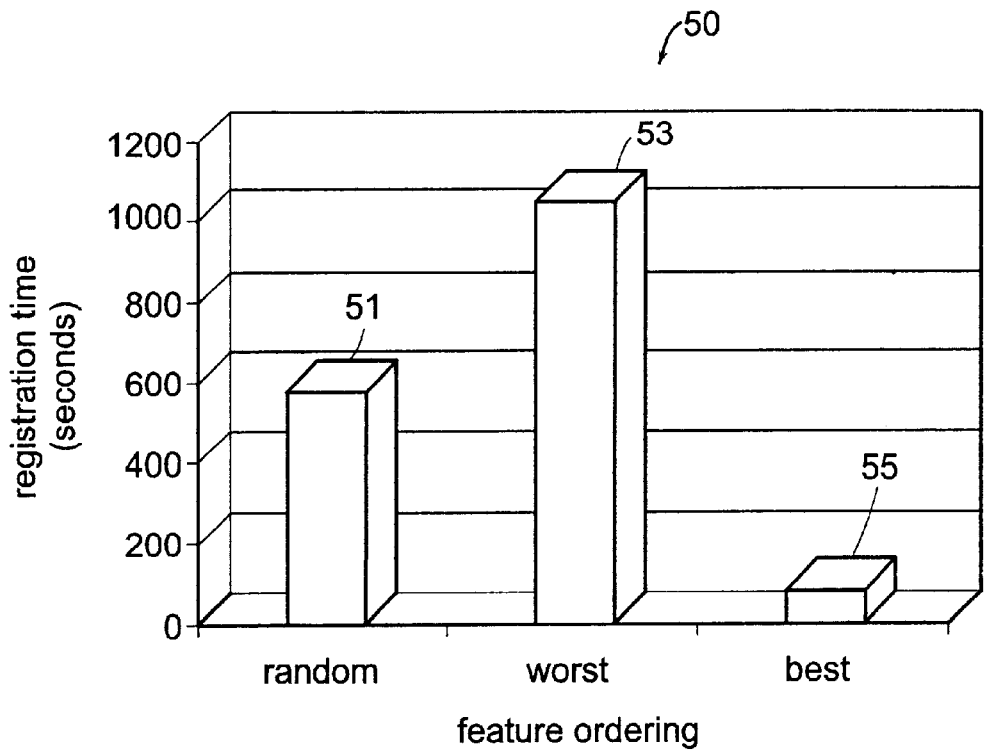
FIG. 5 is a graph illustrating sequential feature registration times with different feature ordering.

FIG. 5 is a graph 50 which illustrates this problem by comparing the amount of time required in Applicants' experiments to register the model using: (a) random ordering of features 51, (b) worst ordering 53, i.e., ordering of features which take the longest registration time, and (c) best ordering of features 55.

The results show that the sequential feature registration time is very sensitive to the ordering of features used. In particular, Applicants are able to achieve a speedup of 24 using an optimal ordering compared to the worst ordering. Hence, when designing an algorithm for sequential feature registration, finding an efficient ordering of the features is critical.

2. Dynamic Sequential Feature Registration

Figure 6:
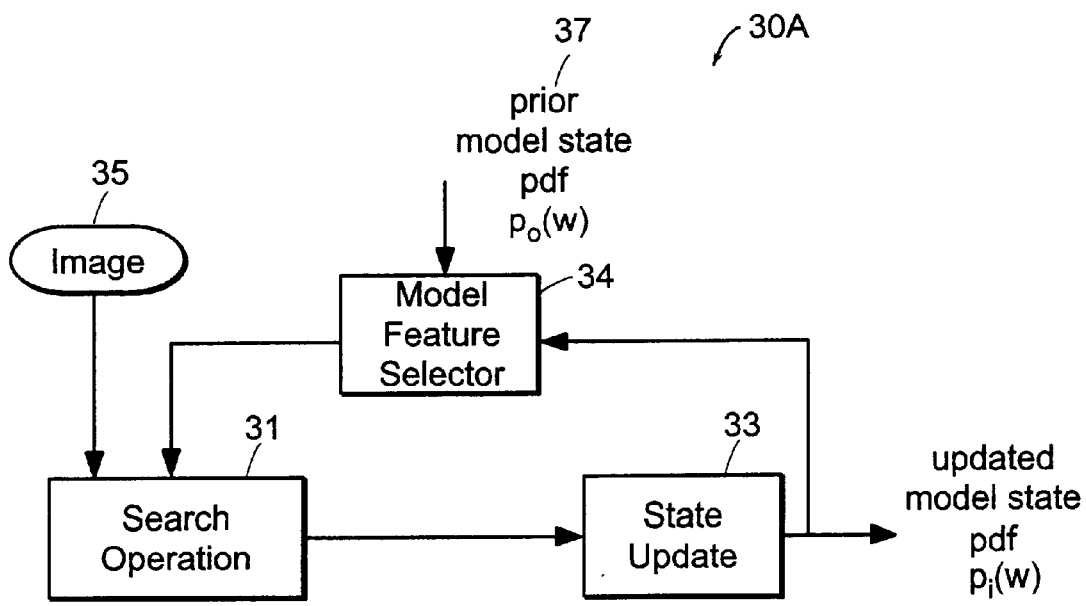
FIG. 6 is a block diagram of a feature-to-image matching embodiment of the present invention.

FIG. 6 is a block diagram of a feature-to-image matching embodiment 30A of the present invention. The sub-optimality of fixed feature ordering is avoided by adding a model feature selector module 34 in the sequential feature registration process 30A. The model feature selector module 34 analyzes the remaining unmatched model features to determine which feature to search next.

In this manner, the feature ordering is determined dynamically during the registration process. Both prior knowledge and the image data are allowed to influence the feature ordering.

Figure 7:
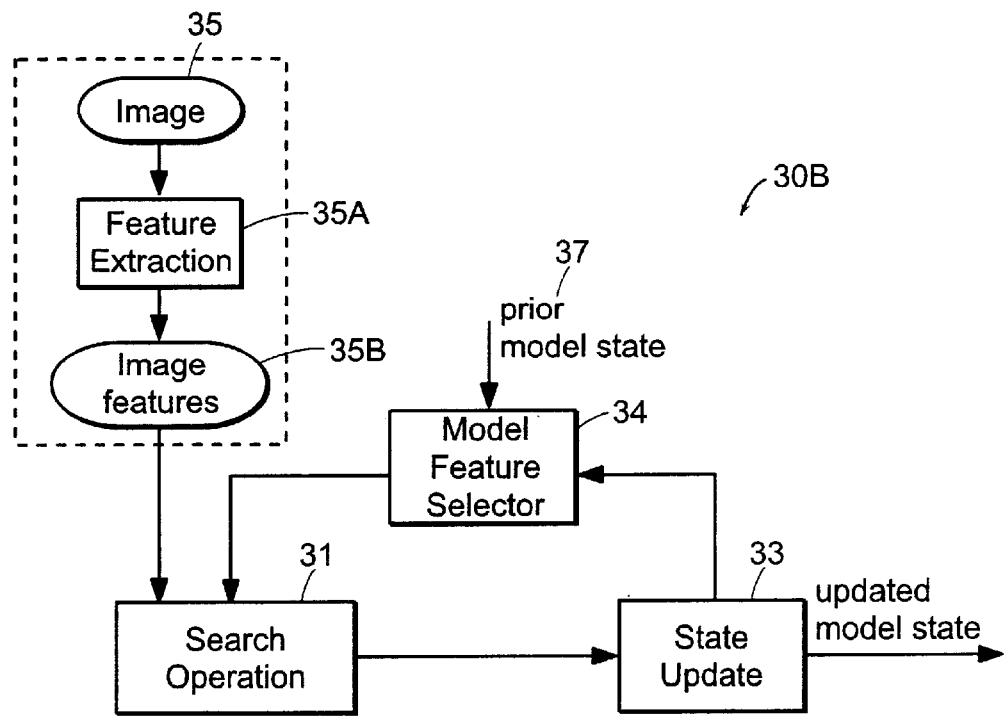
FIG. 7 is a block diagram of a feature-to-feature matching embodiment of the present invention.

FIG. 7 is a block diagram 30B for a feature-to-feature matching embodiment. Here, the image 35 is replaced by a set of image features 35B created by a feature extractor 35A which extracts features from the image 35.

In the next two sections, 2.1 and 2.2, some mathematical notation is established for this framework, and formally describe feature-matching. Section 2.3 explains how the amount of search operations required to match each feature, called the "matching ambiguity," can be determined. Section 2.4 describes the feature-selection module 34 of FIGS. 6 and 7, which orders features dynamically during the matching process. Other components of search initialization, registration and state-update are then discussed.

2.1 Spatial Registration Framework

The spatial registration framework is expressed as follows. Start with an object model M comprising a set of known "source" features F and a set of transformation functions $\{G_1, G_2, \ldots\}$, each of which maps an associated feature into the image. This is described in more detail below. Then, given a target image I, the goal is to match these features to their correct locations in the image and also to recover the parameters of M denoted as a vector w. These features can either be prior knowledge as part of the model specification, or in the case of registering two images, they can represent extracted features.

The amount of searching required in the registration process depends significantly on the a priori knowledge of the model parameters. For example if w has a small prior covariance, such as in video-based tracking applications, feature-to-feature matching may simply involve mapping the source features into the image and searching for the nearest target features. The model parameters may then be computed directly from these correspondences. Similarly, if template features are used instead, registration may be carried out in the model state-space by locally minimizing the pixel residual error. Registration in these problems which have strong priors do not have significant search complexities and all features can be matched simultaneously.

In the case of registering a kinematic model of the figure to an image, F may be the set of template features associated with the links in the model, and M is parameterized by a vector of joint angles and link lengths. These features are not necessarily limited to a single class, as F can simultaneously include templates, corners and edges. It can also include features from different levels of resolution.

2.2 Analysis of Spatial Features

A feature $f \in F$ is described by a number of attributes:

1. A function $G_i: w \rightarrow u$ which maps the model state w to a feature state u for feature $f_i$, in a common feature space. This feature space is common to all features of the same type. For example, if the feature is a point, the common feature space is simply the image space. For more complex features such as templates or edges, the feature space may be further parameterized by including additional rotation, scaling or skew dimensions if necessary.

2. A property vector p which allows a feature to be compared with another feature, or compared to the image, using a comparison function. Examples of such properties are color, shape, etc.

3. Additionally for image-based features such as templates, we specify the dimensions for a "basin of attraction" in feature space. A basin of attraction for a particular feature is a region bounded by the maximum displacement or perturbation between the true and predicted locations of the feature in feature space for which local optimization of the estimated location (via the maximization of a comparison function) guarantees convergence toward the true location.

In the case of feature-to-feature matching, a feature comparison function $C_{ff}(p_i, p_j)$ generates a similarity measure for comparing feature pairs. In the case of feature to image matching, the comparison function $C_{fi}(p_i, u_i, I)$ measures the compatibility between the feature in its current feature state $p_i$ with the image I—it is through the maximization of this function by which the image-based features can be optimally localized.

Finally, we assume that the correct feature pair or feature state maximizes the relevant comparison functions, i.e., once all candidate features or states are tested, the correct solution will be obtained.

2.3 Matching Ambiguity of a Feature

In order to compute the cost of matching a particular feature, we introduce the concept of "matching ambiguity." The matching ambiguity of a feature $f_i$, denoted by $\alpha_i$, is defined as the number of search operations required to find the true match with some specified minimum probability.

Computation of the matching ambiguity for a particular feature can be done in the following way. Starting with the probability distribution of the model state and some specified minimum probability $\rho$ for finding the true match of the feature:

1. Find the regions in the feature space within which the probability density exceeds some threshold.
2. If the total probability within these regions is less than $\rho$, lower the threshold and return to step 1.
3. Compute the number of search operations required to find the match within these regions. For feature-to-feature matching, this is done by counting the number of target features located within the regions. For feature-to-image matching, the regions are divided into volumes which are the size and shape as the basin-of-attraction of the feature. The number of such volumes required to fully cover the regions is then counted.

The number of search operations computed in step 3 is the matching ambiguity.

To illustrate this process, consider an exemplary implementation which assumes that the probability of the model state is based on a Gaussian distribution. We can employ the idea of a search region such as the "validation gate" used in extended Kalman filters and described in Bar-Shalom et al., "Tracking and Data Association," Academic Press, 1988, incorporated by reference herein, to compute the matching ambiguity. This is shown below.

Assume that the estimated model state has a mean $\mu$ and a covariance $\Sigma$. Linearizing the mapping $G_i(w)$ about $\mu$, the covariance $S_i$ in feature space is expressed as $$S_{ji} = J_i \Sigma J_i^T \qquad (1)$$

where $$J_i = \nabla G_i|_{w=\mu} \qquad (2)$$

is the Jacobian. The validation gate is then the volume bounded by an isoprobability surface which may be specified as a factor $\Psi$ of standard deviations.

For feature-to-feature matching, the matching ambiguity is then the number of target features which lie within the validation gate. This may be obtained by evaluating the Mahalanobis distances to potential target features and counting. Unfortunately, this is a potentially intensive computation because it would involve pair-wise comparisons of features. A reasonable approximation which can be used when target features are approximately uniformly distributed is that the matching ambiguity is proportional to the size of the validation gate, i.e.

$$\alpha_i \propto (\|S_{ji}\|)^{1/2} \qquad (3)$$

Since in the algorithm proposed later the matching ambiguities are used to sort the features, the exact values of the matching ambiguities need not be evaluated as long as they can be ranked in the right order.

For feature-to-image matching, the matching ambiguity is the number of minimally-overlapping regions which have the same dimensions as the basin of attraction that would fit into the validation gate. This can be approximated by first obtaining the eigenvalues $e_j$ and eigenvectors $v_j$ to the covariance matrix $S_i$, and then calculating the span of the basin of attraction $b_j$ along each of the $v_j$ directions. Finally, the matching ambiguity is computed as $$\alpha_i \approx \prod_j ceil\left(\psi \frac{\sqrt{e_j}}{b_j}\right) \quad (4)$$

where ceil(.) rounds fractional values up to the next integer.

Matching ambiguity can also be based on further complexity in the search process.

Figures 8A, 8B:
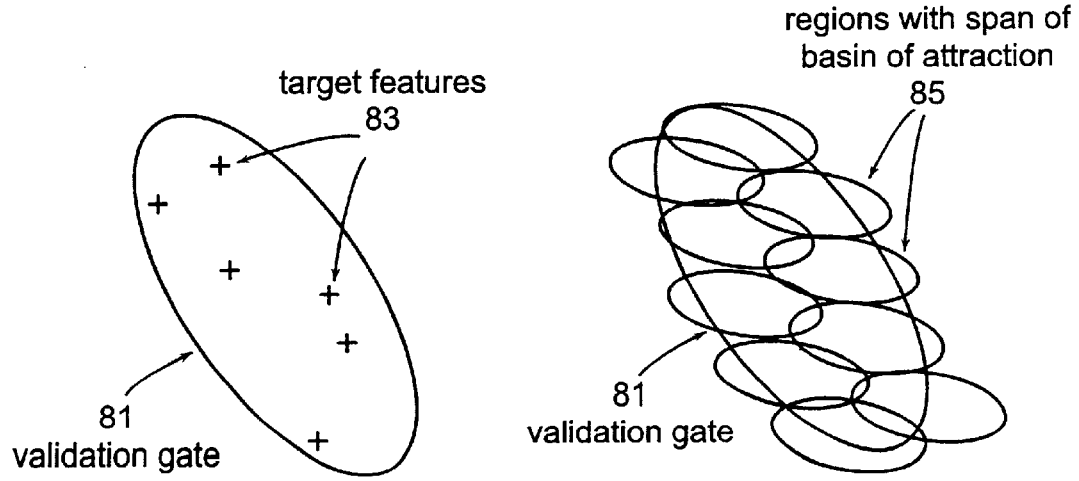
FIGS. 8A and 8B are conceptual diagrams illustrating matching ambiguity for feature-to-feature matching and feature-to-image matching, respectively.

FIGS. 8A and 8B illustrate the concept of matching ambiguity for the two separate cases in this exemplary implementation. Because a Gaussian probability model is assumed here, the validation gate 81 is elliptical.

FIG. 8A shows, for feature-to-feature matching, the target features 83 located within the validation gate 81 of a source feature. The matching ambiguity in this case is the number of candidates to be searched, which here is six. The regions having the same span of the basin of attraction indicated in FIG. 8B are referred to as "attractor regions" 85.

FIG. 8B shows, for feature-to-image matching, minimally overlapping regions 85 with the span of the basin of attraction covering the validation gate 81. The matching ambiguity is the number of regions required, which here is ten.

2.4 Dynamic Feature Ordering and Selection

As each feature is used in the estimation step during sequential search, the model state probability distribution becomes more sharply peaked, reflecting the increased accuracy in the model parameters. This means as each feature is used in the registration process, the high probability regions in feature space become smaller for the remaining unmatched features, thereby leading to a reduction in their matching ambiguities.

First we assume that the intention is to use all available features in the registration process. Then the total number of search operations involved can be minimized by selecting each successive feature to be the feature requiring the smallest number of search operations to be matched, among all remaining features. This ordering of features can only be done at run-time, hence the term "dynamic feature ordering" is used.

Based on this principle of search minimization, an efficient feature selection method is described below which is to be used in the feature selector module 34 of FIG. 6.

Figure 9:
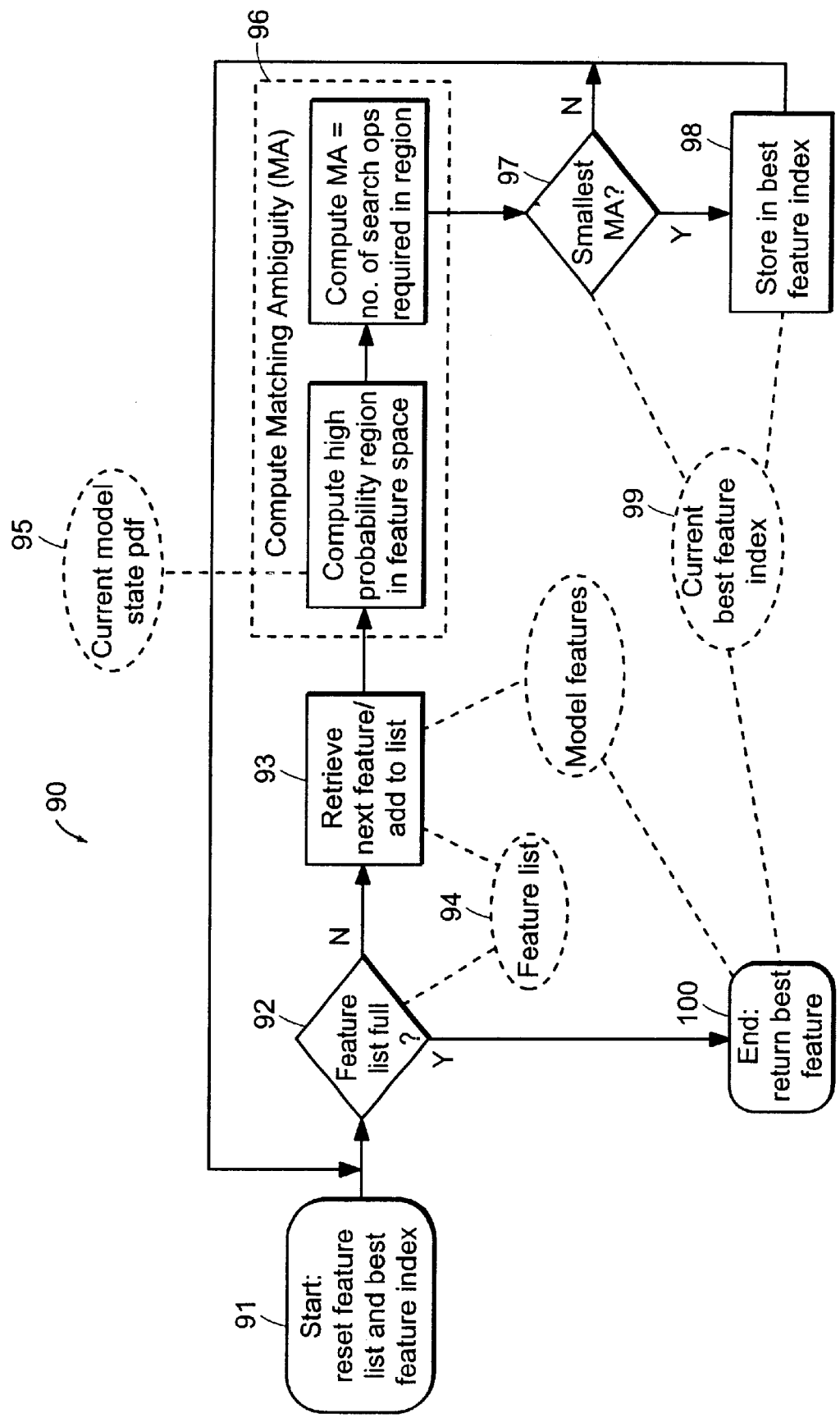
FIG. 9 is a flow diagram for the feature selection module of FIGS. 6 and 7.

FIG. 9 is a flow-chart 90 for this feature selection method.

1. Set the list of used features L as empty, and initialize the "best" feature index. That is, set (database index $i_b$, matching ambiguity $\alpha_d$) to $(-1, \infty)$. (Step 91)
2. Check if L is full, i.e. if it contains all features in the model feature database. Go to step 8 if full. (Step 92)
3. Retrieve the next model feature $f_i$ in the database 94, and add $f_i$ to L. (Step 93)
4. Based on the current model state probability distribution 95, compute, in a matching ambiguity calculator, the matching ambiguity $\alpha_i$ for the feature, using the method described previously in section 2.3. (Step 96)
5. If $\alpha_i > \alpha_b$, return to step 2 (Step 92). (Step 97)
6. Otherwise feature $f_i$ is currently the "best" feature with the smallest matching ambiguity. Update the best feature index 99: $(i_b, \alpha_b)=(i, \alpha_i)$. (Step 98)
7. Return to step 2 (Step 92).
8. The feature with the smallest matching ambiguity has been found. Extract feature with index $i_b$ from the database and pass to the next module in the system (i.e. the search initialization module). (Step 100)

2.5 Search Initialization and Registration

Once the feature selection has been carried out, the search initialization and registration processes for matching a feature is straightforward. Once again this is different for matching to features or directly to the image:

1. For feature-to-feature matching, each image feature which is found within the desired high probability regions in feature space represents a target for the matching the model feature. Registration then involves mapping the model feature to each image feature, and selecting the mapping to the image feature which maximizes the feature-to-feature comparison function $C_{ff}$.
2. For feature-to-image matching, the method of computing the matching ambiguity involves dividing the high probability regions into volumes which are the size and shape as the basin-of-attraction. Hence the initial search points, or "seeds," in the matching process are simply the center points of each basin-of-attraction. Registration then involves mapping the model feature to each of the seeds, locally maximizing the comparison function $C_{fi}$. within the basin-of-attraction, and selecting the optimal mapping of model feature to image.

2.6 State Update

State update involves computing the new probability distribution of the model parameters based on matching the previous feature. State update may be achieved using different methods depending on the probability representation used. For example, probability representations using histogramming, Parzens window, mixture-of-Gaussians, or particle distributions have well-documented methods of updating the probabilities based on additional observations. Parzens window is described in Therrien, "Decision, Estimation and Classification: An Introduction to Pattern Recognition and Related Topics," John Wiley, 1989. Mixture-of-Gaussians is described in Bar-Shalom et al., "Tracking and Data Association," Academic Press, 1988. For particle distributions, see Isard et al., "CONDENSATION—conditional density propagation for visual tracking," Int. Journal of Computer Vision, 29(1), pages 5–28, 1998.

The simple example we will show here is based on the Gaussian model which is parameterized by a mean and covariance. This employs the Kalman filter update step. The updated model mean state $\mu_k$ and covariance $\Sigma_k$ can be computed from the optimally registered feature state $u_b$ with observation covariance $S_b$ via the following equations:

$$\mu_k = \mu_{k-1} + K_k(u_b - J_k \mu_{k-1}) \quad (5)$$

$$\Sigma_k = \Sigma_{k-1} - K_k J_k \Sigma_{k-1} \quad (6)$$

where the subscript k denote the sequential update index and $K_k$ is the Kalman gain given by $$K_k = \Sigma_{k-1} J^T (J\Sigma_{k-1} J^T + S_b)^{-1} \quad (7)$$

Combining all the components discussed in the previous sections, we arrive at a sequential registration method employing the novel feature selection mechanism based on dynamic feature ordering.

Again using an exemplary implementation where a Gaussian probability distribution model is assumed, the complete algorithm is illustrated below:

1. Set the hierarchy list of used features $L_H$ as empty.
2. Compute the matching ambiguities $\alpha_i$ for all unused features, using either equations (3) or (4).
3. Select the feature $f_b$ for which $\alpha_b$ is the smallest matching ambiguity. Note that this step and step 2 above are described in more detail with respect to FIG. 6.

4. Carry out the necessary $\alpha_b$ search operations to recover the optimal feature state $u_b$. This is the minimum number of search operations which have to be performed to register a feature.
5. The optimal feature state $u_b$ and the associated observation covariance $S_b$ is used to improve the model state and covariance by applying the standard Kalman filter update steps (5) and (6).
6. Append $f_b$ to the $L_H$.
7. If all features have been used, stop; otherwise return to step 2.

At the end of the registration process, the hierarchy list of features $L_H$ contains the "feature hierarchy." The feature hierarchy represents the optimal sequential ordering of features and is dependent on the prior model state and covariance, as well as the accuracy of registering each feature. The feature hierarchy must be formed dynamically as part of the estimation process. While the predefined feature orderings used in the algorithms may be reasonably efficient in typical situations, the optimal feature hierarchy can often be found at negligible cost using the 2DYFOR algorithm. Furthermore, the dynamic feature ordering copes even when the prior knowledge changes significantly—using the original predefined feature ordering may not take full advantage of the additional prior knowledge for increasing search efficiency.

3 Experimental Results

An exemplary use of this algorithm is in figure registration. Here we attempt to register a 2D Scaled-Prismatic Model (SPM) to a person in a test image, based on known template features. The SPM model is further described in Morris et al., "Singularity analysis for articulated object tracking", Proc. IEEE Conference Computer Vision and Pattern Recognition, pages 289–296, Santa Barbara, Calif., 1998. A Gaussian probability representation is also used here.

Figure 10A:
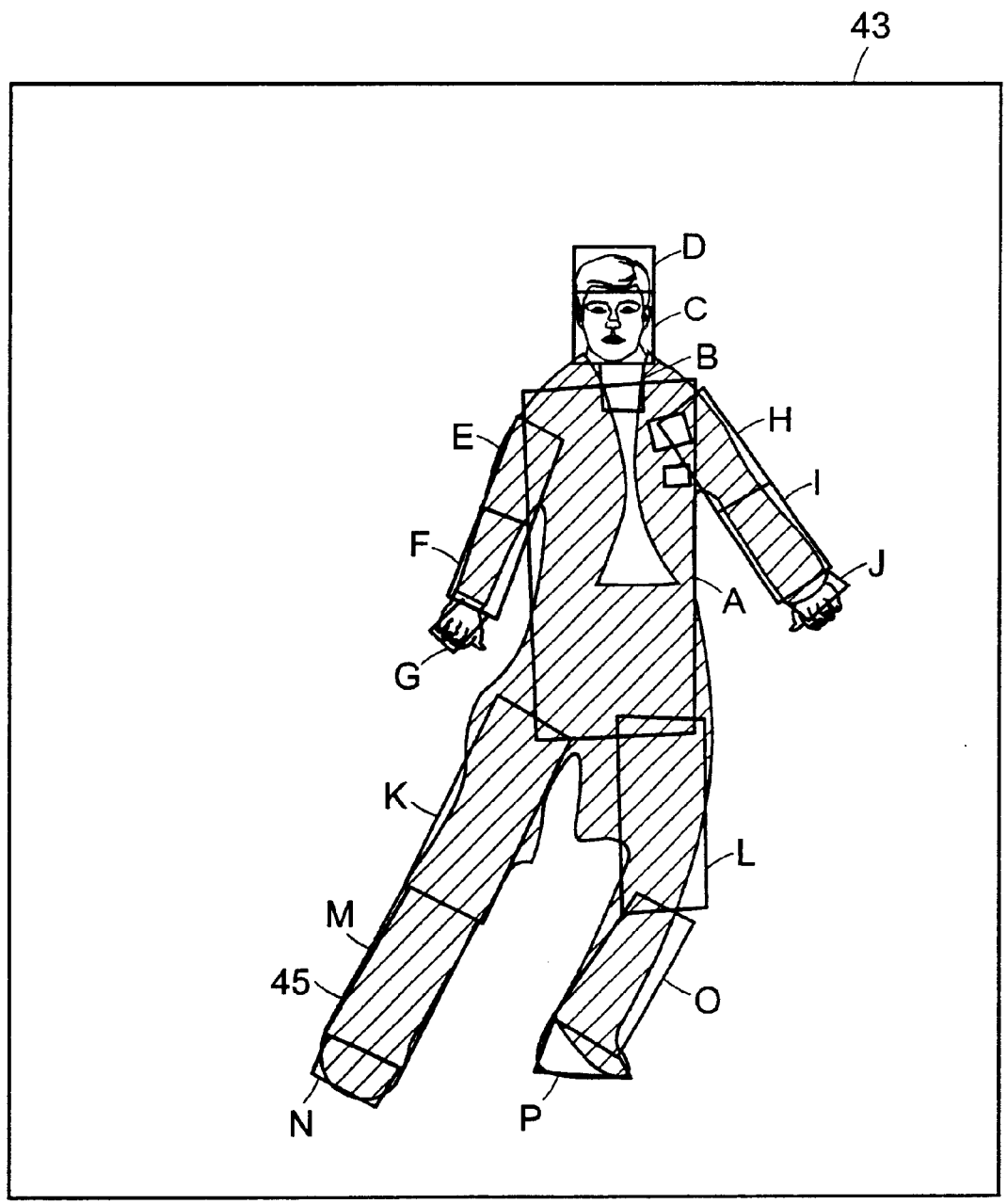
FIG. 10A is a diagram illustrating the dynamic feature ordering, by an embodiment of the present invention, for the image of FIGS. 4A and 4B FIGS. 10B and 10C are diagrams illustrating, respectively, an initial state and a dynamic feature ordering for another image.
Figure 10B:
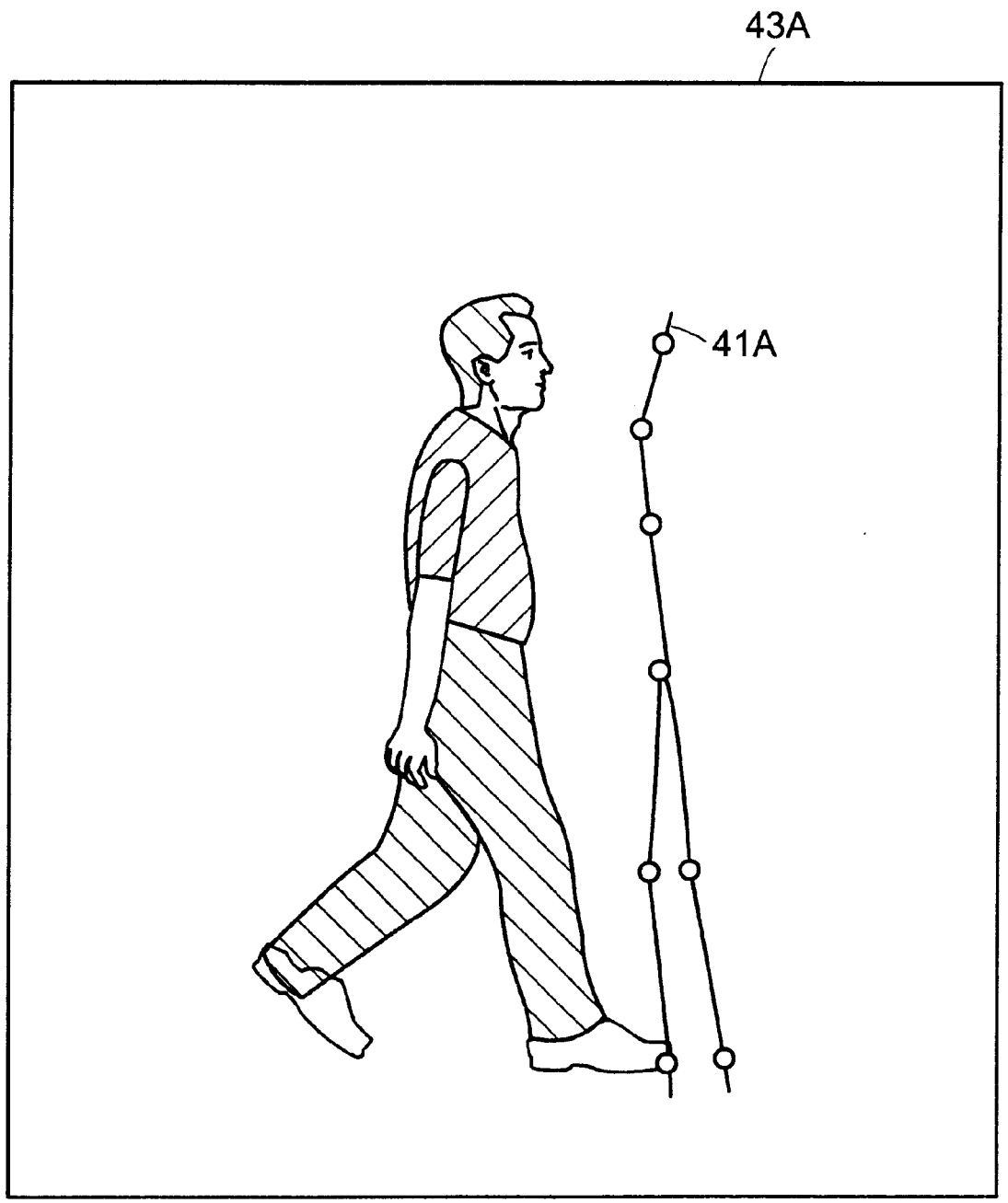

In our experiments which involve localizing the figure with minimal prior knowledge, the model state is initialized as denoted by the pose of the stick figure in the images of FIGS. 4A and 10B. The prior covariance is set as a diagonal matrix with standard deviations of 50 pixels for global x translation, 20 pixels for global y translation, 2 radians for joint angles and 10 pixels for link lengths. The only strong prior is that the torso is approximately upright as we wish to restrict our search to upright figures. For each template, the basin of attraction for the refinement step is set to be its minimum dimension at present, although a more formal analysis may be applied in the future based on the spatial frequency content of the templates.

FIG. 10A illustrates the feature ordering that arises in the registration process for the image of FIGS. 4A and 4B. The ordering is indicated alphabetically, "A" indicating the first ordered feature, "B" the second, and so on. The feature ordering obtained in these instances is similar to a size-based ordering, except that in the algorithm employed by the preferred embodiment of the present invention, the ordering is done both automatically and dynamically. The registration localizes the figure well despite the high dimensionality of the figure model and the weak prior knowledge.

Figure 10C:
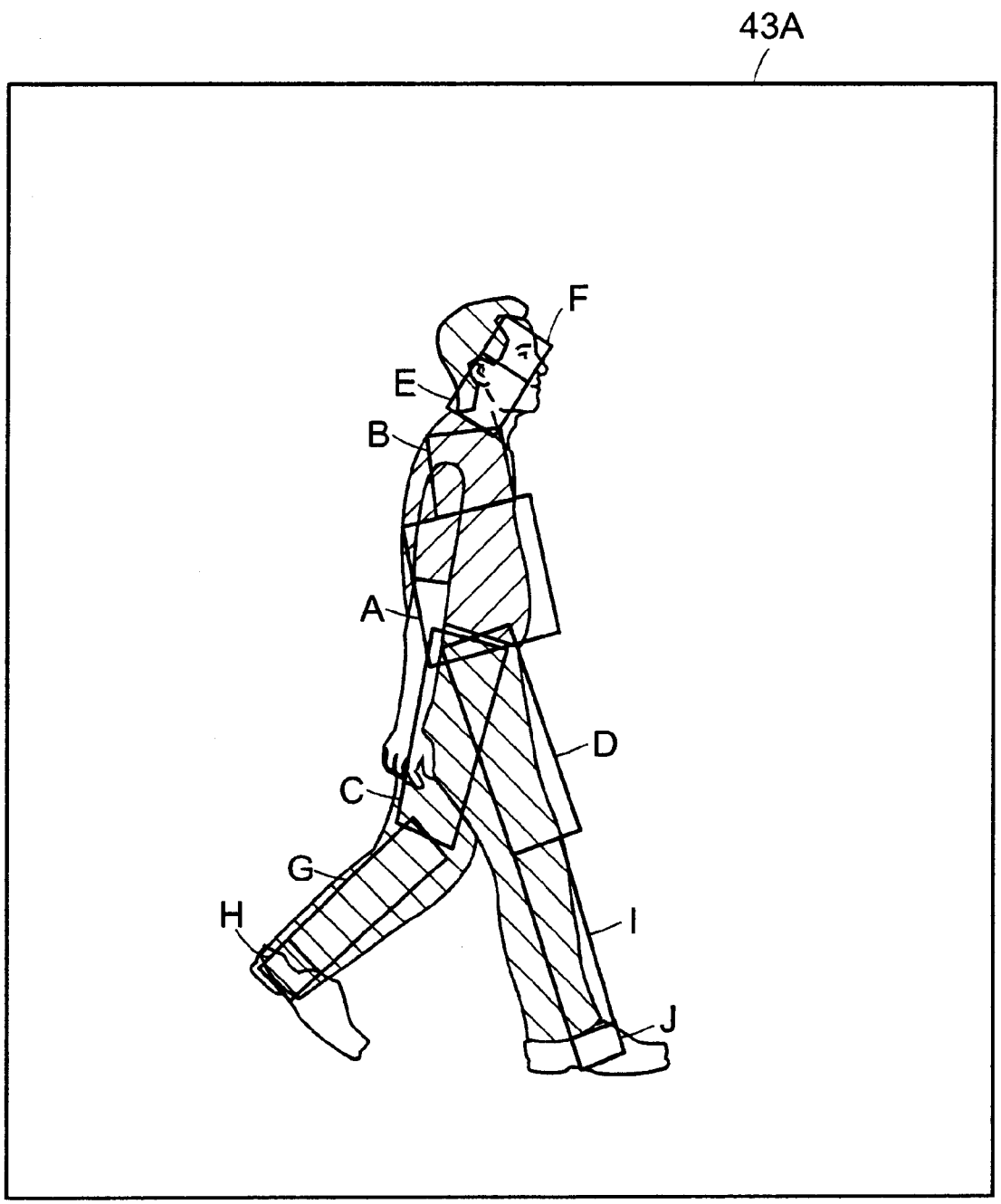

FIGS. 4A and 10B each show the respective initial, or prior states of their kinematic models, represented by stick figures 43, 43A, respectively. Weak generic priors are used in these two test cases. As the coupled dynamic feature ordering algorithm is iterated, the next template feature selected is the one requiring the least amount of search operations for registration. FIGS. 10A and 10C show, in alphabetic order, the feature ordering.

Figure 11A:
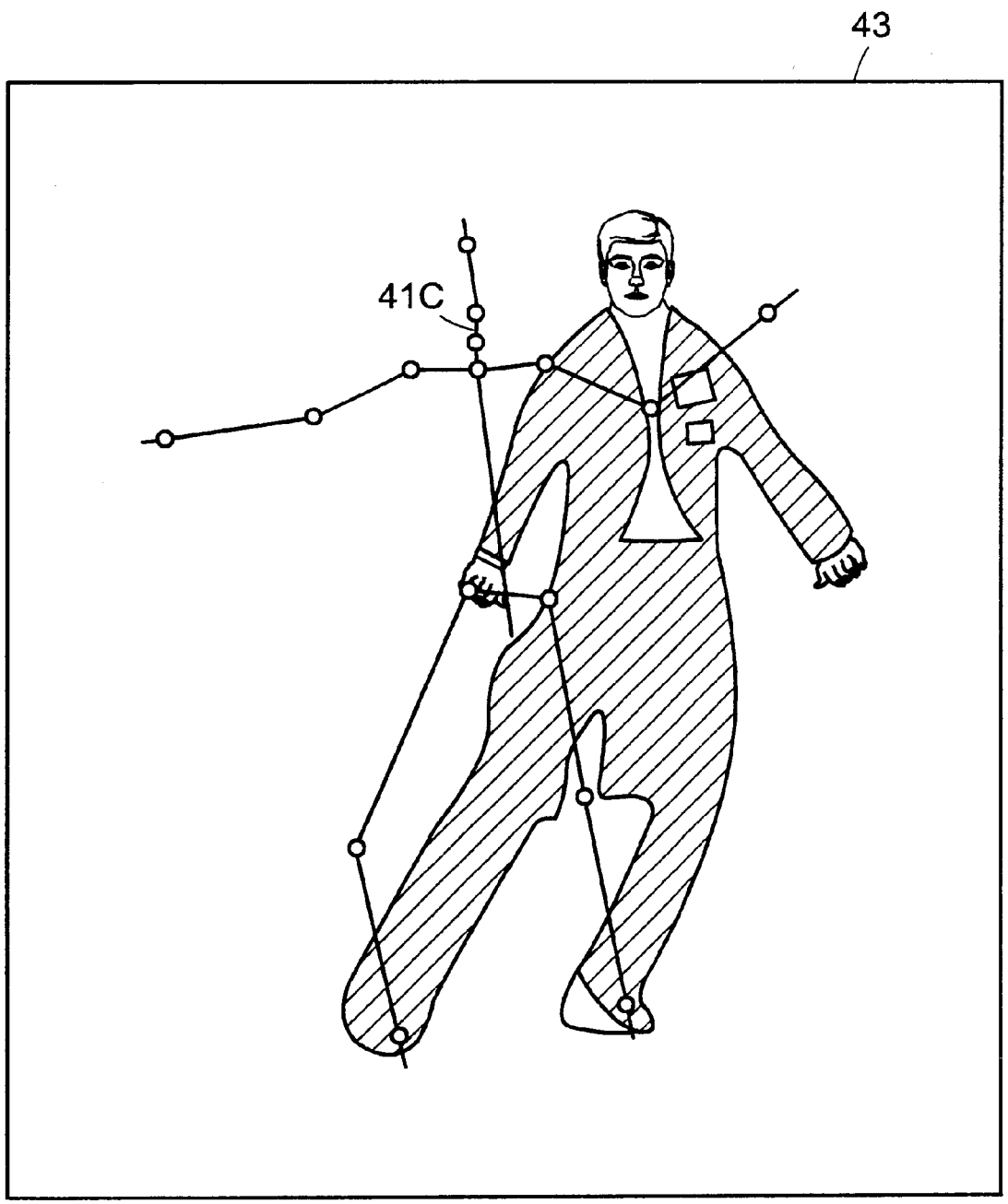
FIGS. 11A–11D are diagrams which illustrate initial states and resulting dynamic feature ordering for the images of FIGS. 10A–10C when some strong prior knowledge is used.
Figure 11B:
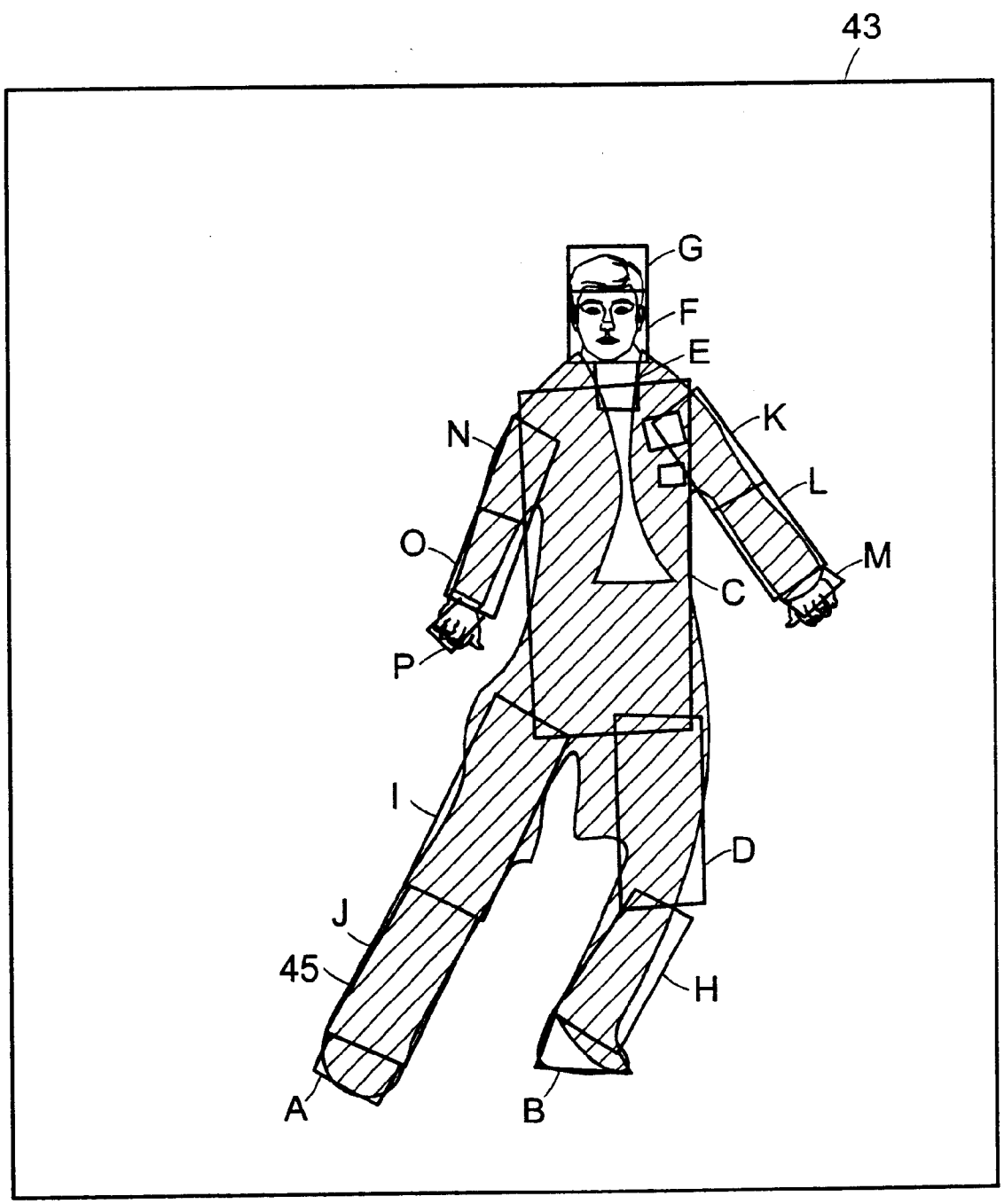
Figure 11C:
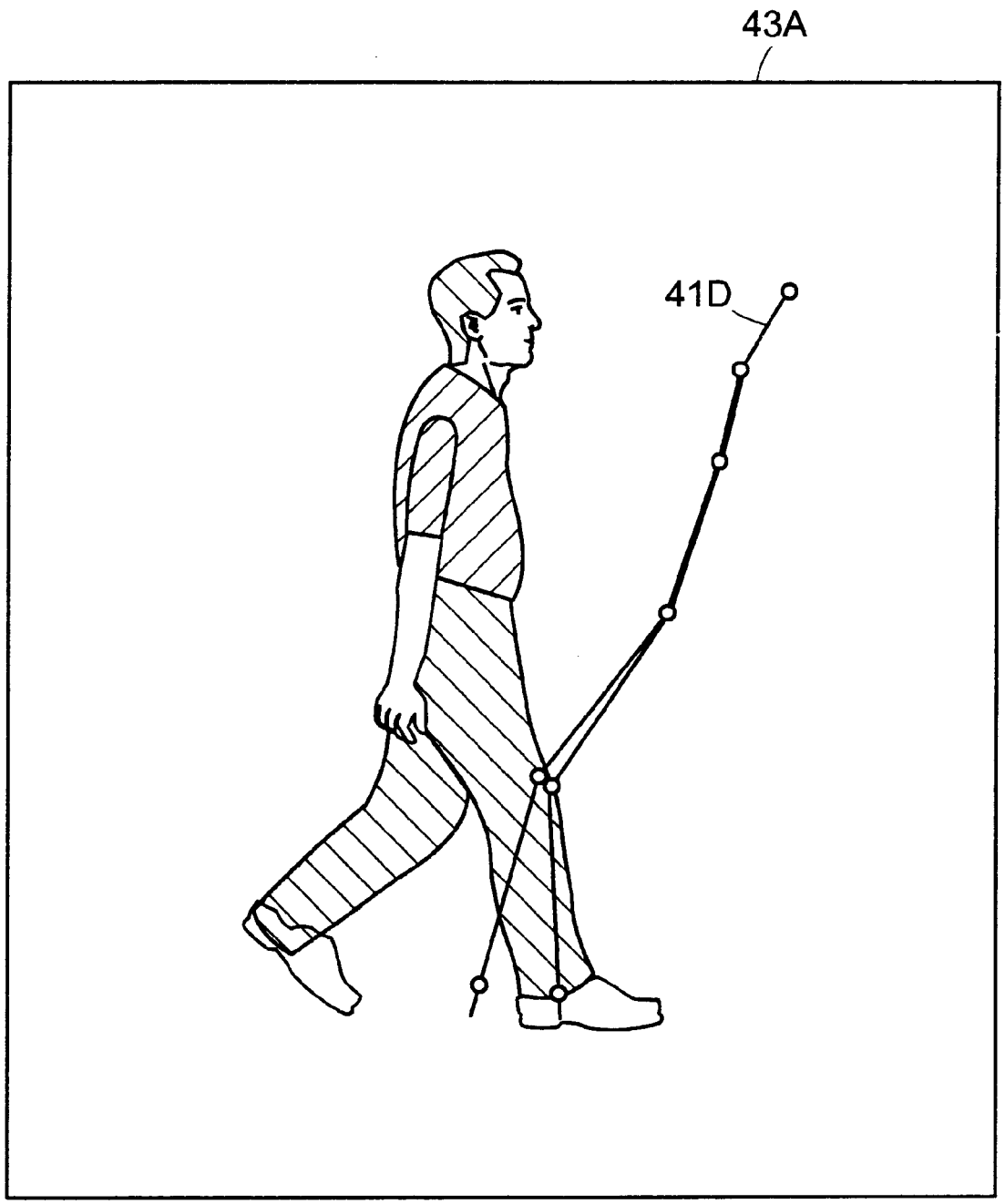

FIGS. 11A and 11C show the initial models used when various forms of strong prior knowledge are available which is captured in the prior covariance. For the image 43 of FIG. 11A, the feet template positions are accurately positioned, while for the image 43A of FIG. 11C, the front shin template position is accurately positioned. A 5-pixel standard deviation is used for these constraints. The feature ordering for these instances, shown respectively in FIGS. 11B and 11D, differs significantly from the ordering obtained in FIGS. 10A and 10C. Also notice, for example in FIG. 11D, that the optimal feature ordering does not propagate along the articulated chains which contradicts the proposed heuristic of Hel-Or et al.

In FIG. 11A, the positions of the two foot templates are assumed to be known accurately. In FIG. 11C, the position of the front shin template is known accurately. As can be seen by comparing FIG. 11B with FIG. 10A, and FIG. 11D with FIG. 10C, the feature ordering obtained when strong prior knowledge is available can be significantly different from the ordering with weak generic priors. Although not shown, the initial registration of some feature such as the left leg in the case of FIGS. 11A and 11C can be corrected as more features are integrated into the estimation.

The first sequence images generally took approximately forty to fifty seconds for the localization, while the second sequence images took approximately five to twenty seconds because of the simpler model used. In both instances the number of samples used for initializing the search of individual templates appears to be significantly more than is necessary, which is due to the conservative estimates for the span of the basins of attraction in the refinement process. More accurate estimates could easily be substituted.

Figure 11D:
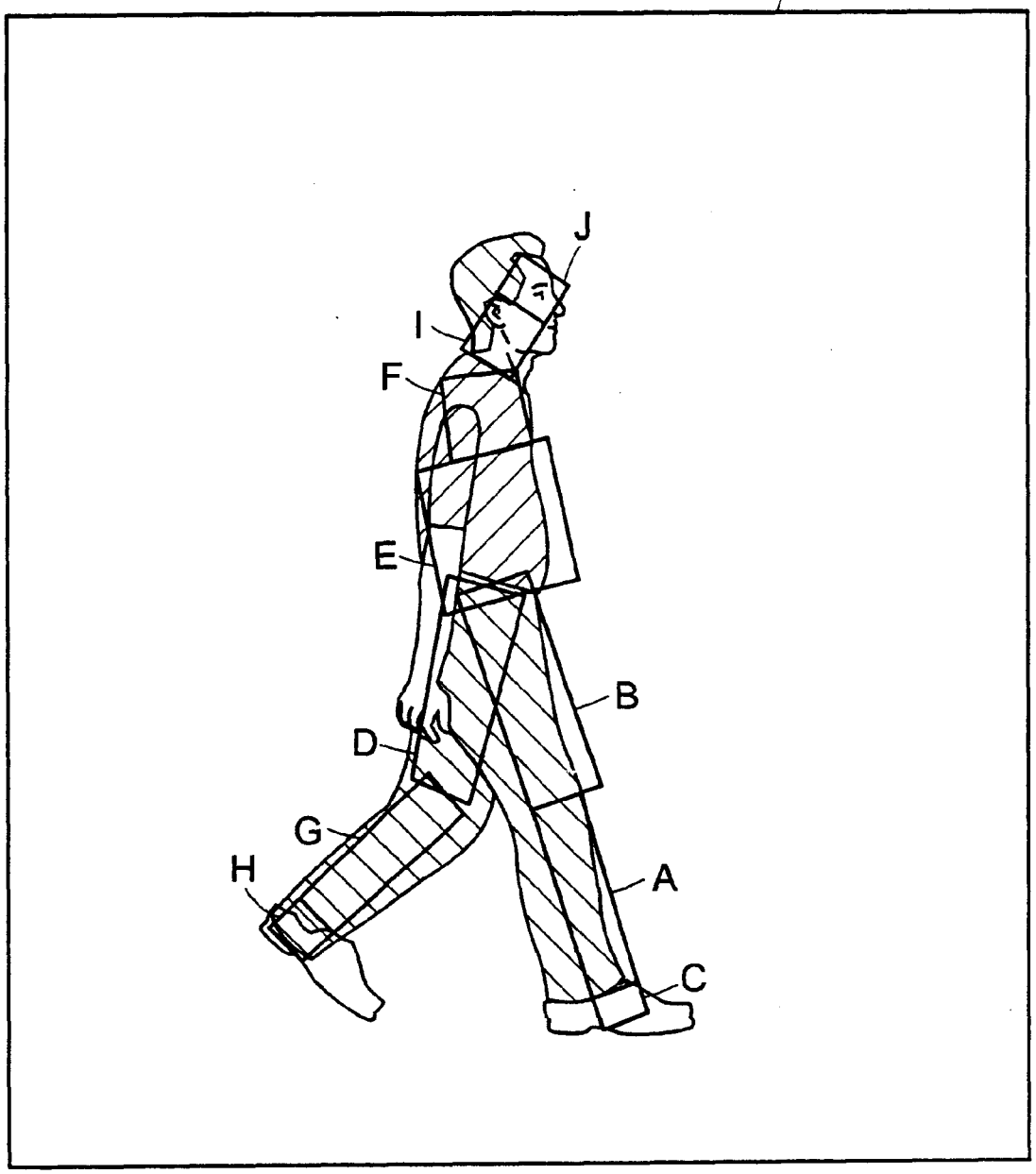
Figure 12:
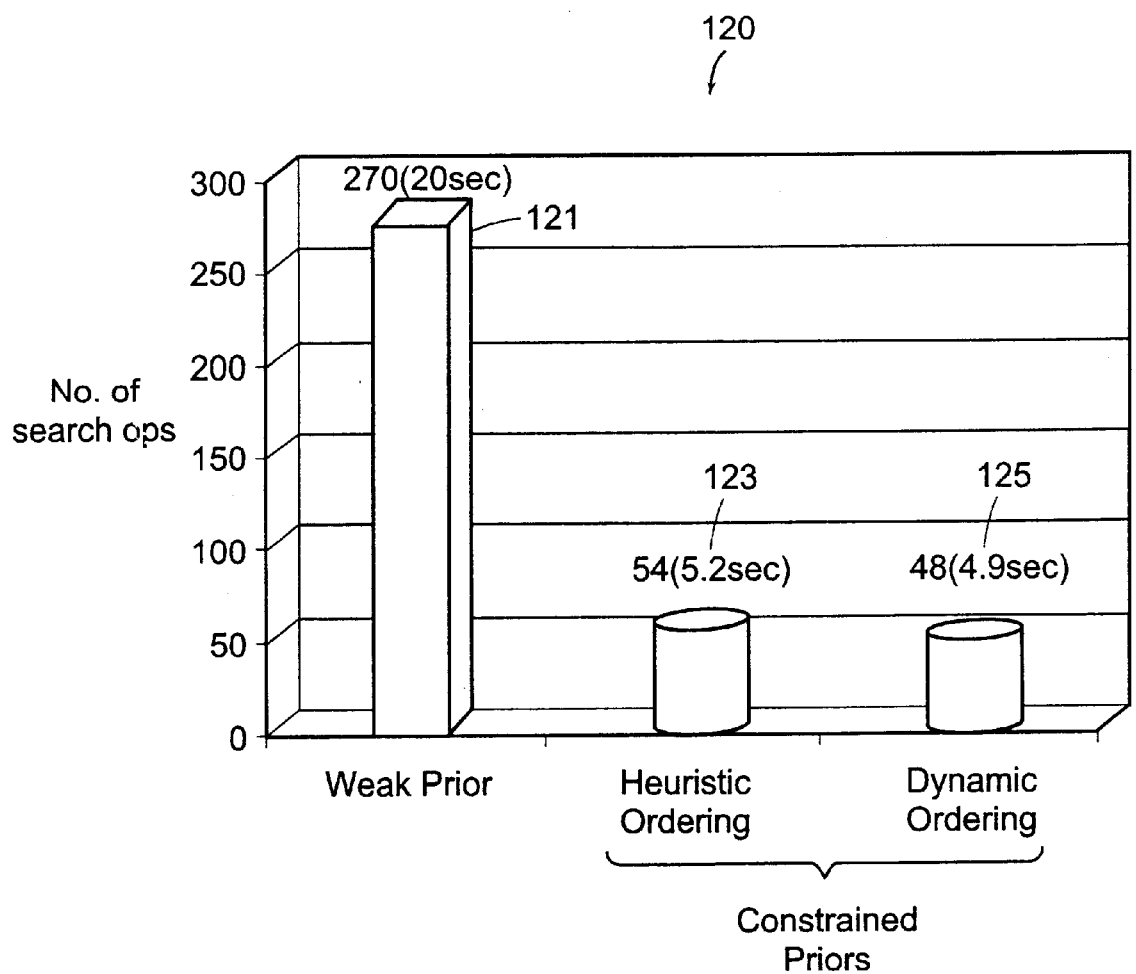
FIG. 12 is a graph comparing quantitative results for three different feature orderings using the image of FIGS. 11C and 11D.

FIG. 12 is a graph 120 showing quantitative results for a comparison of three different feature orderings using the sequence of FIG. 11D.

The left bar 121 shows, for weak prior ordering, the number of search operations and computation time required to complete the registration without prior knowledge of the location of the shin. The center bar 123, corresponding to a heuristic ordering, shows the result obtained when the shin position is known, but a heuristic-based fixed ordering of largest to smallest template is used. The right bar 125 shows the result obtained when the shin position is known and the present invention's dynamic feature ordering is used. The result provides empirical evidence that dynamic feature ordering is superior to heuristic-based fixed orderings, especially when partial prior knowledge is available.

4 Use of the Invention

Since registration is a basic problem in computer vision, an improved registration technique could impact many application domains. In particular, this invention could increase the efficiency of detection and tracking systems, making it possible to use more complex object models or process larger data sets with fixed computational resources.

Computing Optimal Fixed Feature Orderings

One use of the invention is to automatically precompute fixed feature orderings that have been tuned to a particular class of registration problems. This could be helpful in situations where the cost of computing the optimal feature ordering on-line is prohibitively expensive. It is worth mentioning that this has not been the case for the examples we have considered.

In a preferred embodiment of this method, a representative training data set consisting of a multiplicity of examples of registration problems is constructed. These examples are chosen to characterize the range of problems that a fixed ordering would need to address. An optimal feature ordering is constructed for each of the examples using the method described above. The matching ambiguities for each distinct feature are compared across the set of optimal feature orders. The result is an average matching ambiguity for each feature. Sorting the feature list on the basis of the average matching ambiguity gives a static feature order. Of course, many alternative schemes for constructing the fixed feature order could be employed.

Application to Visual Tracking

Tracking systems work by propagating an initial registration between a model and an image target over time. As each new frame arrives, the state of the model is updated in order to maintain its correspondence with the image. Before tracking can take place, the tracker must be initialized by identifying a state that places it in correspondence with an initial image. Subsequent re-initialization may be necessary to recover from failures during tracking.

Figure tracking is an important task in surveillance, user-interface, and video editing applications. It is challenging due to the complexity of the object model and its large number of degrees of freedom. This is a domain which could particularly benefit from our framework, as evidenced by the experiments in Section 3.

Tracking using detailed kinematic models of humans is computationally intensive and difficult to run in real-time, and hence simplified models are often used. This invention could enable tracking applications based on more complex models, as well as improve computational performance in tracking with simple models. Improved performance could result from automatically "tuning" the search strategy to the constraints of a particular video clip.

For example, the limited range of motion of an actor in a TV weather program can be exploited during tracking by registering the torso features first. In contrast, in sports footage such as gymnastics, alternative search orders will be more effective. In tracking a gymnast's performance on the rings, for example, the hands are the most stationary feature and would be registered first. The present invention makes it possible to perform this tuning process automatically, without the need for additional context from the footage itself.

Furthermore, tracking systems may periodically lose track of the target due to distractors such as shadows, occlusion, and background clutter. Our invention would allow trackers with complex models to be re-initialized efficiently. This would facilitate real-time tracking for applications such as a smart conference room, which could detect and initialize tracking on new entrants as well as reinitialize tracks that become lost when individuals temporarily occlude one another.

Application to Object Detection

Object detection problems arise in video and image retrieval applications, as well as in military targeting and surveillance problems. These problems are characterized by a wide range of potential sensing cues and demanding computational requirements. Efficient feature ordering could improve performance by choosing features so as to maximize the gain from each sensing operation.

For example, an interesting problem for image retrieval is the detection of figures in single images. This problem is challenging because of the wide range in human appearance and the lack of motion cues which are present, for example, in video content. A wide range of cues can be employed, including skin and hair color, silhouette edges, texture models for clothing and hair, and template models for faces, hands, and feet. The present invention makes it possible to automatically deduce the correct order in which to apply these cues, based on the contents of a given image.

While one could imagine building a dynamic feature order by hand for a specific problem like figure detection, the true potential of our invention becomes apparent when you consider the wide range of objects such as cars, buildings, etc. that may be of interest for retrieval purposes. The present invention provides a general mechanism for efficient search that is not limited to a specific type of target.

Figure 13:
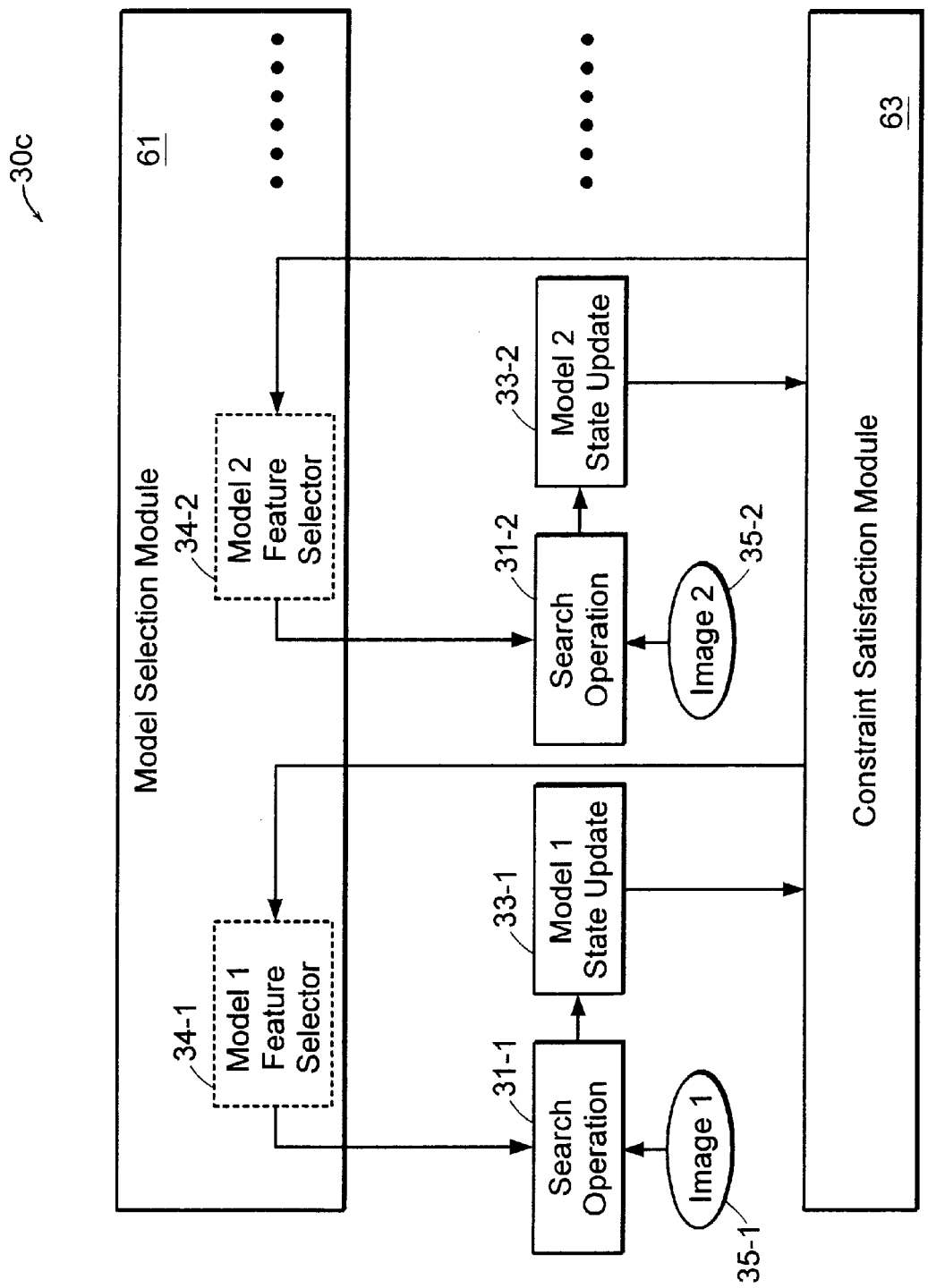
FIG. 13 is a block diagram of a preferred embodiment of the present invention which provides a method for object registration via selection of models with dynamically ordered features.

5. Object Registration via Selection of Models with Dynamically Ordered Features FIG. 13 is a block diagram of a preferred embodiment of the present invention which provides a method for object registration via selection of models with dynamically ordered features. The invention couples a plurality of independent registration processes which are preferably based on dynamic feature ordering. The registration processes may use different models, different features and even access different images 35. This coupling is done through two components: a model selection module 61, and a constraint satisfaction module 63.

The system 30C works by matching only a subset of features during any sequential registration cycle, instead of separately matching all features in parallel. This is achieved by choosing a number of "operative processes" from all registration processes. Each of these chosen or selected operative processes conducts a feature search operation based on its selected feature.

In a preferred embodiment, there is only one operative process in each registration cycle. Hence, only one feature is matched at any one time, out of the entire collection of all features in all models.

The resulting reduction in the number of parallel feature search operations prevents unnecessary redundancy. For example, this allows all parallel processors to be utilized for matching a small number of features, instead of matching features in all the models simultaneously. The latter method is inefficient because more search operations are required than in the former case, where earlier matched features can be used to restrict the search space for remaining unmatched features.

5.1 Model Selection

Figure 14:
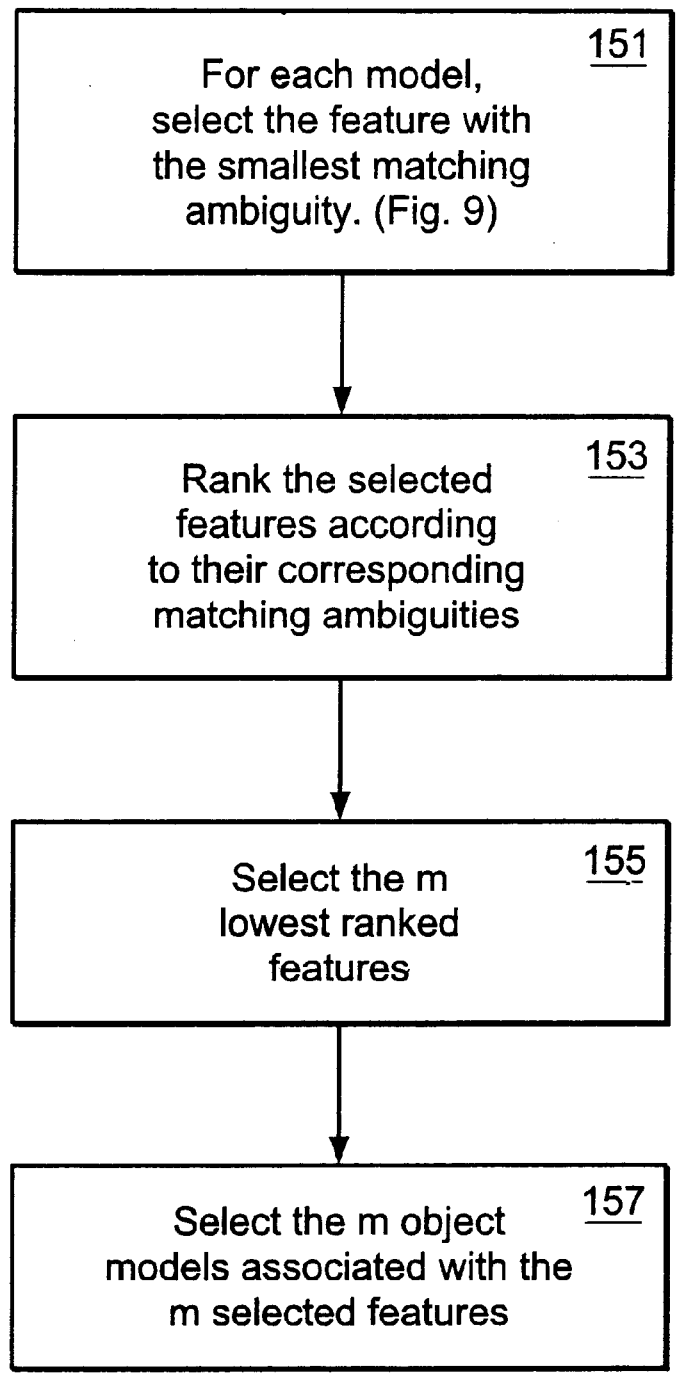
FIG. 14 is an flowchart corresponding to the model selection module of FIG. 13.

FIG. 14 is an flowchart 150 corresponding to the model selection module 61 of FIG. 13. The primary goal of the model selection module 61 is to choose the operative processes which require the minimal amount of search operations. For each matching cycle, this works as follows.

First, at step 151, each process has a model feature selector 34 which computes the next candidate feature to be matched within the remaining set of unmatched features in the model. In a preferred embodiment, this feature has the smallest matching ambiguity within the model feature set. Hence, for n models, there are n candidate features. This selection process is discussed above with respect to FIG. 9.

Second, at step 153, the model selection module 61 ranks the n candidate features, preferably according to their matching ambiguities. At step 155, the m features with the smallest matching ambiguities are then selected. These features $\{f_i\}^*$ require the fewest search operations for matching, compared to all other candidate features.

Finally, at step 157, the m processes associated with $\{f_i\}^*$ are then made the operative processes. They are allowed to proceed and conduct the feature search operations 31 on the associated features and update 33 each of their model states.

In a preferred embodiment, there is only one operative process during each matching cycle. The selected model contains the feature with the smallest matching ambiguity in the entire collection of unmatched features in all models.

One skilled in the art could of course envision an embodiment where a single search operation block 31 or state update block 33 could be reused for multiple processes.

5.2 Constraint Satisfaction

The constraint satisfaction module 63 takes as input the updated states from the active models. Any constraints on the model states are then satisfied by minimally modifying some or all of the models states, including the non-active model states, i.e., those not associated with operative processes. Constraints may be both intra-model as well as inter-model constraints.

Figure 15:
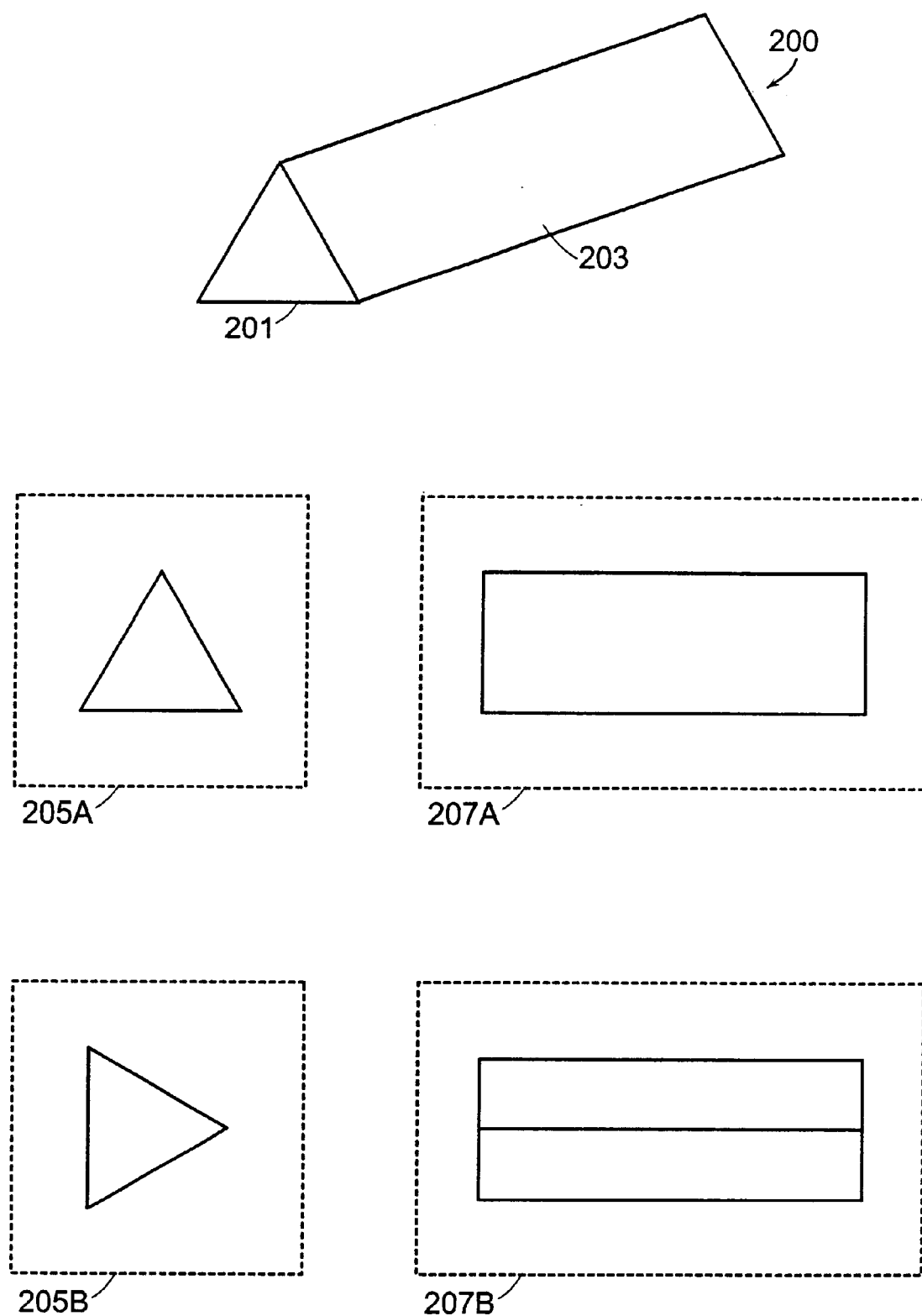
FIG. 15 is an illustration demonstrating constraints between object models for a common object.

FIG. 15 is an illustration demonstrating constraints between object models for a common object, here for example a solid prism 200 having a triangular end 201 and a rectangular face. In this simplified example, two images are available 205, 207, each having an associated object model. Constraints may define, for example, the size and length of certain segments. Another constraint may be that the model corresponding to image 205 is an end view of the prism 200, while a second model, corresponding to image 207 is a front view. If another constraint is the physical shape of the actual prism object 200, registering the object model of 205A as shown would lead to a determination of the configuration of the object model of 207A, which could then be updated accordingly. Similarly, the configuration of the object model of 205B would lead to the corresponding object model of 207B.

Of course, this simple example can be expanded to include more complicated object models, such as the human body with various limbs being the features. A model state can include factors including, but not limited to, for example, translation, scaling, rotation, length, color, etc.

After constraint satisfaction, all processes are allowed to proceed in parallel to the feature selection stage. Control then returns to the model selection module.

In an exemplary implementation, linear constraints on the model states can be specified in the following way.

First, an augmented state-vector X is defined by $$X = [x_1 x_2 \ldots x_N 1] \tag{8}$$

Second, the linear constraints can then be specified in the matrix form $$AX = 0 \tag{9}$$

At the end of any matching cycle, estimated model states $\hat{x}_i$ are available together with the associated covariance matrices $\hat{S}_i$. The constraint satisfaction problem can then be defined by $$\min_X \sum_i \{(\hat{x}_i - x_i)^T S_i^{-1} (\hat{x}_i - x_i)\} \tag{10}$$

subject to A X=0

The solution of Equation (10) can be achieved via a number of methods, including the method of Lagrange multipliers. These methods are discussed in detail in Linear and Nonlinear Programming by Luenberger, second edition, Addison-Wesley, 1984.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for registering a plurality of object models in at least one image, each object model comprising a plurality of features and described by a model state, the method comprising:

selecting, for each object model, an unregistered feature of the object model to minimize a cost function of a subsequent search, each model having an associated cost function;

selecting, responsive to the minimized cost functions, a subset of the object models;

searching, for each selected object model, for a match of the associated selected model feature to the at least one image to register the feature;

updating, responsive to the step of searching for a match, the model states of the selected object models;

enforcing constraints by updating model states of the object models responsive to the constraints; and repeating the steps of selecting unregistered features, selecting a subset of object models, searching, updating and enforcing constraints.

2. The method of claim 1, wherein each cost function is based on a basin of attraction for the feature being searched.

3. The method of claim 2, wherein each cost function is further based on complexity of searching at each basin of attraction.

4. The method of claim 1, wherein searching is performed in a region of high probability of a match.

5. The method of claim 4 wherein a search region is based on a projected state probability distribution.

6. The method of claim 1, wherein searching is based on maximizing a comparison function.

7. The method of claim 1 wherein selecting an unregistered feature and searching are responsive to a propagated state probability distribution.

8. The method of claim 7 wherein the state probability distribution is projected into feature space.

9. The method of claim 1 wherein selecting an unregistered feature comprises:

for each unregistered feature of an object model, determining the associated cost function's value as a number of search operations required to find a match with at least a predetermined probability; and selecting a feature requiring a least number of search operations.

10. The method of claim 9, wherein determining the number of search operations for a feature comprises:

determining search regions within a feature space, each region having an associated probability density; and computing the number of required search operations based on the determined search regions.

11. The method of claim 10, wherein determining search regions comprises:

finding search regions within the feature space, such that each region's associated probability density exceeds a predetermined threshold;

summing the probabilities associated with each of the found search regions to form a total probability; and while the total probability is less than a predetermined probability, lowering the threshold and repeating the steps of finding search regions and summing the probabilities.

12. The method of claim 10, wherein searching comprises feature-to-feature matching.

13. The method of claim 12, wherein the number of search operations is the number of target features located within each search region.

14. The method of claim 13 wherein the number of target features located within the search region is based on Mahalanobis distances to potential target features.

15. The method of claim 12 wherein target features are approximately uniformly distributed, and the number of features is proportional to the search region's size, the method further comprising:
   ranking the features according to the sizes of the associated search regions.

16. The method of claim 10 wherein searching comprises feature-to-image matching.

17. The method of claim 16 wherein computing the number of required search operations comprises, for each search region,
   dividing the region into minimally-overlapping volumes having a same size and shape as a basin of attraction associated with the feature; and
   counting such volumes required to cover the regions.

18. The method of claim 17, wherein counting volumes is approximated by:
   obtaining eigenvalues and eigenvectors to a covariance matrix associated with the feature search region;
   calculating a basin of attraction span for each eigenvector direction; and
   approximating a count responsive to the eigenvalues and the spans.

19. The method of claim 1, wherein updating the model states is according to a propagated state probability distribution.

20. The method of claim 19, wherein the propagation of the probability distribution is based on successive registered features.

21. The method of claim 1, wherein the step of selecting a subset of the object models comprises:
   ranking the selected unregistered features by associated cost function value; and
   selecting object models responsive to the ranking.

22. The method of claim 21, wherein ranking currently selected features is responsive to values of cost functions associated with the currently selected features.

23. The method of claim 21, wherein a predetermined number of object models is selected responsive to the ranking.

24. The method of claim 1 wherein different object models have different features.

25. The method of claim 1 wherein the subset of the object models includes one object model, the one object model having a selected feature with the smallest associated cost function value among all selected features.

26. The method of claim 1, wherein a constraint restricts a plurality of model states to a shared relationship.

27. The method of claim 1, wherein enforcing comprises minimally modifying the model states such that the given set of constraints is satisfied.

28. The method of claim 1, wherein linear constraints are satisfied by using Lagrange multipliers.

29. The method of claim 1 wherein constraints comprise intra-model constraints.

30. The method of claim 1 wherein constraints comprise inter-model constraints.

31. A method for registering a plurality of object models in at least one image, each object model comprising a plurality of features and described by a model state, comprising:
   selecting, for each object model, an unregistered model feature based initially on a prior state probability model, and subsequently on a propagated state probability model;
   selecting, responsive to the probability models, a subset of the object models;
   searching, for each selected object model, for a match of the associated selected model feature to the at least one image to register the feature;
   updating the state probability models of the selected object models based on an optimal configuration;
   enforcing constraints by updating state probability models of the object models responsive to the constraints, the updated state probability models being propagated for a next iteration; and
   repeating the steps of selecting unregistered features, selecting a subset of object models, searching, updating, and enforcing constraints.

32. The method of claim 31 wherein selecting an unregistered model feature for a given object model comprises:
   determining, for each unregistered feature of the object model, a number of search operations required to find a match with at least a predetermined probability; and
   selecting a feature requiring a least number of search operations.

33. The method of claim 32, wherein determining a number of search operations for an unregistered feature comprises:
   determining search regions within a feature space, each search region having an associated probability density, such that a total probability equal to the sum of the search regions' associated probability densities exceeds a predetermined probability, wherein the number of required search operations is based on the found search regions.

34. The method of claim 33, wherein determining search regions comprises: iteratively finding search regions such that each search region's associated probability density exceeds a predetermined threshold, lowering the predetermined threshold each iteration until the total probability exceeds the predetermined probability.

35. The method of claim 33, wherein searching comprises:
   performing feature-to-feature matching, such that the number of required search operations is related to the number of target features located within the search regions.

36. The method of claim 35 wherein the number of features which lie within the search region is based on Mahalanobis distances to potential target features.

37. The method of claim 36 wherein, when target features are approximately uniformly distributed, the number of features is proportional to the search region's size, such that selecting a feature comprises:
   ranking the features according to the sizes of their associated search regions.

38. The method of claim 33 wherein searching comprises:
   performing feature-to-image matching, such that the number of required search operations is related to a number of minimally-overlapping volumes having a same size and shape as a basin of attraction associated with the feature, the volumes being sufficient to cover the regions.

39. The method of claim 38, wherein the number of volumes is approximated with a count responsive to eigenvalues and basin of attraction spans, the eigenvalues associated with a covariance matrix associated with the feature search region, and each span based associated with an eigenvector direction.

40. A system for registering an a plurality of object models in at least one image, each object model comprising a plurality of features and described by a model state, the system comprising:

a plurality of feature selection modules, each feature selection module associated with an object model, wherein each feature selection module selects an unregistered feature of its associated object model to minimize a cost function of a subsequent search, each object model having an associated cost function;

a model selection module which, responsive to the selected features, selects a subset of the object models;

a plurality of search modules, each search module associated with an object model, wherein each search module searches for a match of its associated object model's selected model feature to the at least one image to register the feature;

a plurality of update modules, each update module associated with an object model, wherein each update module updates its associated object model's model state based on the match found by the corresponding search module; and a constraint satisfaction module which enforces constraints by updating model states of the object models responsive to the constraints.

41. The system of claim 40, wherein a cost function for a given feature is based on the feature's basin of attraction.

42. The system of claim 41, wherein the cost function is further based on complexity of searching at each basin of attraction.

43. The system of claim 40, wherein at least one search module searches in a region of high probability of a match.

44. The system of claim 43 wherein a search region is based on a projected state probability distribution.

45. The system of claim 40, wherein at least one search module searches based on maximizing a comparison function.

46. The system of claim 40, wherein, for a given object model, the associated selection feature module and search module are responsive to a propagated state probability distribution of the object model.

47. The system of claim 46 wherein the state probability distribution is projected into feature space.

48. The system of claim 40 wherein each feature selection module determines, for each unregistered feature of the associated object model, a number of search operations required to find a match with at least a predetermined probability, and selects a feature requiring a least number of search operations.

49. The system of claim 48, wherein all of the object models have the same predetermined probability.

50. The system of claim 48, wherein at least one feature selection module, to determine the number of search operations for a feature, determines search regions within a feature space, each region having an associated probability density, and computes the number of required search operations based on the determined search regions.

51. The system of claim 50, wherein the at least one feature selection module, to determine search regions, iteratively finds search regions within the feature space such that each region's associated probability density exceeds a predetermined threshold, and sums the probabilities associated with each of the found search regions to form a total probability, lowering the threshold and performing another iteration if the total probability is less than a predetermined probability.

52. The system of claim 50, wherein at least one search module performs feature-to-feature matching.

53. The system of claim 52, wherein the number of search operations is the number of target features located within each search region.

54. The system of claim 53 wherein the number of target features located within the search region is based on Mahalanobis distances to potential target features.

55. The system of claim 52 wherein target features are approximately uniformly distributed, and the number of features is proportional to the search region's size, and wherein the search module ranks the features according to the sizes of the associated search regions.

56. The system of claim 50 wherein at least one search module performs feature-to-image matching.

57. The system of claim 56 wherein the feature selection module associated with the ast least one search module, to compute the number of required search operations, for each search region, divides the region into minimally-overlapping volumes having a same size and shape as a basin of attraction associated with the feature, and counts such volumes required to cover the regions.

58. The system of claim 57, wherein the feature selection module uses an approximation to a volume count, the approximation derived by obtaining eigenvalues and eigenvectors to a covariance matrix associated with the feature search region, calculating a basin of attraction span for each eigenvector direction, and approximating a count responsive to the eigenvalues and the spans.

59. The system of claim 40, wherein at least one update module updates its associated object model's model state according to a propagated state probability distribution.

60. The system of claim 59, wherein the propagation of the probability distribution is based on successive registered features.

61. The system of claim 40 wherein at least one constraint is an intra-model constraint.

62. The system of claim 40 wherein at least one constraint is an inter-model constraint.

63. The system of claim 40 wherein each feature selection module is uniquely associated with one object model.

64. The system of claim 40 wherein a feature selection module is associated with plural object models.

65. The system of claim 40 wherein each search module is uniquely associated with one object model.

66. The system of claim 40 wherein a search module is associated with plural object models.

67. The system of claim 40 wherein each update module is uniquely associated with one object model.

68. The system of claim 40 wherein an update module is associated with plural object models.

69. A system for registering a plurality of object models in at least one image, each object model comprising a plurality of features and described by a model state, comprising:

a plurality of feature selection modules, each feature selection module associated with an object model, wherein each feature selection module selects an unregistered model feature based initially on a prior state probability model, and subsequently on a propagated state probability model;

a model selection module which, responsive to the selected features, selects a subset of the object models;

a plurality of search modules, each search module associated with an object model, wherein each search module searches the at least one image and finds an optimal configuration for the associated object model's selected model feature;

a plurality of update modules, each update module associated with an object model, wherein each update module updates its associated object model's state probability model based on an optimal configuration; and a constraint satisfaction module which enforces constraints by updating the state probability models responsive to the constraints, the updated state probability model being propagated to the feature selection modules.

70. The system of claim 69 wherein at least one feature selection module comprises:

a matching ambiguity calculator which determines, for each unregistered feature of the associated object model, a number of search operations required to find a match with at least a predetermined probability, the feature selection module selecting a feature requiring a least number of search operations.

71. The system of claim 70, wherein, for each unregistered feature, the matching ambiguity calculator determines search regions within a feature space, each search region having an associated probability density, such that a total probability equal to the sum of the search regions' associated probability densities exceeds a predetermined probability, and wherein the matching ambiguity calculator computes the number of required search operations based on the found search regions.

72. The system of claim 71, wherein the matching ambiguity calculator determines search regions by iteratively finding search regions such that each search region's associated probability density exceeds a predetermined threshold, lowering the predetermined threshold each iteration until the total probability exceeds the predetermined probability.

73. The system of claim 71, wherein at least one searching module performs feature-to-feature matching, such that the number of required search operations is related to the number of target features located within the search regions.

74. The system of claim 73 wherein the number of features which lie within the search region is based on Mahalanobis distances to potential target features.

75. The system of claim 74 wherein, when target features are approximately uniformly distributed, the number of features is proportional to the search region's size, such that the associated feature selection module ranks the features in order corresponding to their associated search regions.

76. The system of claim 71 wherein at least one searching module performs feature-to-image matching, such that the number of required search operations is related to a number of minimally-overlapping volumes having a same size and shape as a basin of attraction associated with the feature, the volumes being sufficient to cover the regions.

77. The system of claim 76, wherein the number of volumes is approximated with a count responsive to eigenvalues and basin of attraction spans, the eigenvalues associated with a covariance matrix associated with the feature search region, and each span based associated with an eigenvector direction.

78. A computer program product for registering a plurality object models in at least one image, each object model comprising a plurality of features and described by a model state, the computer program product comprising a computer usable medium having computer readable code thereon, including program code which iteratively:

selects, for each object model, an unregistered feature of the object model to minimize a cost function of a subsequent search, each model having an associated cost function;

selects, responsive to the minimized cost functions, a subset of the object models;

searches, for each selected object model, for a match of the associated selected model feature to the at least one image to register the feature;

updates, responsive to the match searches, the model states of the selected object models; and enforces constraints by updating model states of the object models responsive to the constraints.

79. The computer program product of claim 78 wherein, in selecting an unregistered feature, the program code further:

determines, for each unregistered feature, a number of search operations required to find a match with at least a predetermined probability; and selects a feature requiring a least number of search operations.

80. An article of manufacture comprising:

a computer usable medium having computer readable program code means embodied therein for causing registration of a plurality of object models in at least one image, each object model comprising a plurality of features and described by a model state, the computer readable program code means in said article of manufacture comprising:

feature selecting computer readable program code means for causing a computer to select, for each object model, an unregistered feature of the object model to minimize a cost function of a subsequent search, each model having an associated cost function;

model selecting computer readable program code means for causing a computer to select, responsive to the minimized cost functions, a subset of the object models;

searching computer readable program code means for causing a computer to search, for each selected object model, for a match of the selected model feature to the at least one image to register the feature;

updating computer readable program code means for causing a computer to update, for each selected object model, the model state;

constraint enforcing readable program code means for causing a computer to update model states of the object models responsive to constraints; and computer readable program code means for causing a computer to iteratively execute the feature selecting, model selecting, searching, updating and constraint enforcing computer readable program code means.

81. The article of claim 80, further comprising:

matching ambiguity determining computer readable program code means for causing a computer to determine, for each selected object model's associated selected unregistered feature, a number of search operations required to find a match with at least a predetermined probability, wherein the feature selecting computer readable program code means selects a feature requiring a least number of search operations.

82. A method for registering a plurality of object models in at least one image, each object model comprising a plurality of features and described by a model state, the method comprising:

associating a registration process with each object model;

selecting a subset of the registration processes;

for each selected process, selecting an unregistered feature of the associated object model;

searching for a match of the selected model features to the at least one image to register the selected features;

updating, responsive to the step of searching for a match, the model state associated with each process;

enforcing constraints by updating models states responsive to the constraints; and repeating the steps of selecting a subset, selecting unregistered features, searching, updating and enforcing constraints.

83. The method of claim 82, wherein selecting a subset of the processes comprises:

selecting an unregistered feature for each registration process to minimize a cost function of a subsequent search;

ranking the selected features in all registration processes; and selecting a predetermined number of processes responsive to the ranking.

84. The method of claim 83, wherein ranking selected features is responsive to matching ambiguities of the selected features.

85. The method of claim 84 wherein the subset of the processes includes one process, the one process having the smallest matching ambiguity among all processes.

86. The method of claim 82 wherein linear constraints are satisfied using Lagrange multipliers.

* * * * *